(12) United States Patent
Breidenbach

(10) Patent No.: US 11,892,201 B2
(45) Date of Patent: Feb. 6, 2024

(54) INSTALLATION APPARATUS/TOOL FOR TUBULAR GEOTHERMAL HEAT EXCHANGER SYSTEMS AND METHODS

(71) Applicant: Thomas Scott Breidenbach, Maple Grove, MN (US)

(72) Inventor: Thomas Scott Breidenbach, Maple Grove, MN (US)

( * ) Notice: Subject to any disclaimer, the term of this patent is extended or adjusted under 35 U.S.C. 154(b) by 1164 days.

(21) Appl. No.: 15/897,155

(22) Filed: Feb. 15, 2018

(65) Prior Publication Data

US 2018/0238591 A1 Aug. 23, 2018

Related U.S. Application Data

(62) Division of application No. 14/214,938, filed on Mar. 15, 2014, now Pat. No. 9,897,347.

(60) Provisional application No. 61/801,639, filed on Mar. 15, 2013.

(51) Int. Cl.
| | |
|---|---|
| *F28D 7/02* | (2006.01) |
| *F24T 10/13* | (2018.01) |
| *E21B 7/20* | (2006.01) |
| *E21B 10/44* | (2006.01) |
| *F24T 10/00* | (2018.01) |

(52) U.S. Cl.
CPC ............ *F24T 10/13* (2018.05); *E21B 7/205* (2013.01); *E21B 10/44* (2013.01); *F24T 2010/53* (2018.05); *F28D 7/02* (2013.01); *Y02E 10/10* (2013.01)

(58) Field of Classification Search
CPC ....... F28D 7/02; F28D 7/04; F24J 3/08; F24T 10/13
USPC ........................................................... 165/45
See application file for complete search history.

(56) References Cited

U.S. PATENT DOCUMENTS

| | | | |
|---|---|---|---|
| 2,203,881 A | 6/1940 | Schwab et al. | |
| 3,183,675 A | 5/1965 | Schroeder | |
| 4,528,737 A * | 7/1985 | Cosenza | B25B 27/143 |
| | | | 29/240.5 |
| 4,538,673 A | 9/1985 | Partin et al. | |
| 4,768,270 A * | 9/1988 | Czarnowski | B25B 27/143 |
| | | | 29/240.5 |
| 4,980,959 A * | 1/1991 | Czarnowski | B25B 27/143 |
| | | | 29/240.5 |
| 5,054,541 A | 10/1991 | Tripp | |

(Continued)

FOREIGN PATENT DOCUMENTS

| | | |
|---|---|---|
| CN | 2783220 Y | 5/2006 |
| CN | 101408359 A | 4/2009 |

(Continued)

OTHER PUBLICATIONS

Machine Translation KR 10-2012-0025079, pp. 7 (Year: 2012).*

(Continued)

*Primary Examiner* — Sunil Singh
(74) *Attorney, Agent, or Firm* — Thomas Scott Breidenbach

(57) ABSTRACT

A method of installing a tubular heat exchanger into soil includes providing the tubular heat exchanger and screwing the tubular heat exchanger into the soil with an installation apparatus. The installation apparatus may be removed from the soil without removing the tubular heat exchanger from the soil.

35 Claims, 28 Drawing Sheets

(56) References Cited

U.S. PATENT DOCUMENTS

| | | | |
|---|---|---|---|
| 5,212,865 A * | 5/1993 | Davis | B25B 27/143 29/240.5 |
| 5,329,992 A | 7/1994 | Tripp | |
| 5,339,890 A | 8/1994 | Rawlings | |
| 5,623,986 A | 4/1997 | Wiggs | |
| 6,000,459 A | 12/1999 | Jeppesen | |
| 6,041,862 A | 3/2000 | Amerman | |
| 6,421,899 B1 * | 7/2002 | Zitnay | B25B 27/143 29/240.5 |
| 6,641,332 B1 | 11/2003 | Alvarado | |
| D488,486 S | 4/2004 | Hibbs | |
| D498,771 S | 11/2004 | Hibbs | |
| D501,915 S | 2/2005 | Roesch et al. | |
| 6,860,320 B2 | 3/2005 | Johnson, Jr. et al. | |
| 6,920,924 B2 | 7/2005 | Roesch et al. | |
| 7,213,649 B2 | 5/2007 | McNair et al. | |
| 7,380,605 B1 | 6/2008 | Wolf | |
| 7,587,799 B2 * | 9/2009 | Li | B25B 27/143 29/240.5 |
| 7,647,988 B2 | 1/2010 | Roussy | |
| 8,132,631 B2 | 3/2012 | Roussy | |
| 8,161,759 B2 | 4/2012 | Kidwell et al. | |
| 8,210,281 B2 | 7/2012 | Roussy | |
| 8,262,322 B2 | 9/2012 | Desmeules | |
| 2002/0166420 A1 * | 11/2002 | Giannakakos | B25B 27/143 81/444 |
| 2003/0221870 A1 | 12/2003 | Johnson, Jr. | |
| 2005/0061472 A1 | 3/2005 | Guynn et al. | |
| 2008/0083565 A1 | 4/2008 | Roussy | |
| 2009/0014216 A1 | 1/2009 | Stevens | |
| 2009/0065255 A1 | 3/2009 | Roussy | |
| 2009/0250200 A1 | 10/2009 | Kidwell et al. | |
| 2010/0040419 A1 | 2/2010 | Roussy | |
| 2010/0139886 A1 | 6/2010 | Desmeules | |
| 2010/0200192 A1 | 8/2010 | Consigny | |
| 2013/0004244 A1 | 1/2013 | Reid et al. | |

FOREIGN PATENT DOCUMENTS

| | | | |
|---|---|---|---|
| DE | 3149636 A * | | 7/1983 |
| EP | 0153268 A * | | 8/1985 |
| EP | 0615818 A1 * | | 9/1994 |
| EP | 1084800 A2 * | | 3/2001 |
| JP | 2003014385 A * | | 1/2003 |
| JP | 2003035455 A | | 2/2003 |
| JP | 2005-188866 | * | 7/2005 |
| JP | 2005-188866 A | * | 7/2005 |
| JP | 2006010098 A | | 1/2006 |
| JP | 2006071134 A | * | 3/2006 |
| JP | 2007-326162 A | * | 12/2007 |
| JP | 4180510 B2 | * | 11/2008 |
| JP | 2009-68749 | * | 4/2009 |
| JP | 2009-68749 A | * | 4/2009 |
| JP | 4594956 B2 | * | 12/2010 |
| JP | 4595956 B2 | * | 12/2010 |
| JP | 2011007446 A | | 1/2011 |
| JP | 2015-34664 | * | 2/2015 |
| KR | 10-2008-0023626 | * | 3/2008 |
| KR | 10-2012-0025079 | * | 3/2012 |
| KR | 20120025079 A | * | 3/2012 |
| KR | 10-2014-0132118 | * | 11/2014 |
| WO | WO 80/02736 A1 | | 12/1980 |
| WO | WO 2007/142014 A1 * | | 12/2007 |
| WO | WO 2011/088312 A2 | | 7/2011 |
| WO | WO 2011/088312 A3 | | 7/2011 |
| WO | WO 2012/051338 A1 | | 4/2012 |

OTHER PUBLICATIONS

Machine Translated Korean document 10-2014-0132118 (Year: 2014).*

Machine Translation of JP 2005-1888866, pp. 9 (Year: 2005).*

Screwpiles, webpage, Jan. 27, 2013, Wikipedia, 2 Pages.

Geodrill 20 V, brochure, Jun. 2008, Tracto Technik, 2 Pages.

Geothermal Radial Drilling, brochure, Mar. 2008, Tracto-Technic, 4 Pages.

Geothermal Heat Pump, webpage, Sep. 10, 2010, Wikipedia, 16 Pages.

Geothermal Exchange Pipe, brochure, Oct. 12, 2010, Centennial Plastics LLC, 6 Pages.

Auger, webpage, Feb. 15, 2013, Wikipedia, 2 Pages.

* cited by examiner

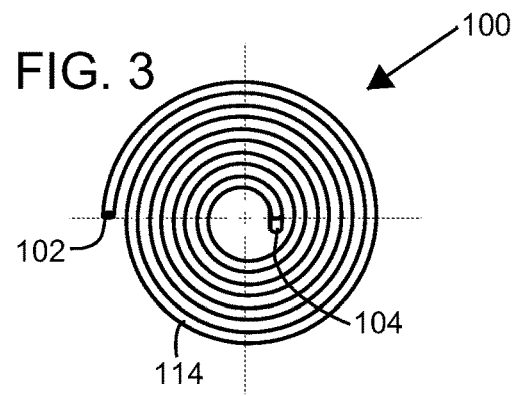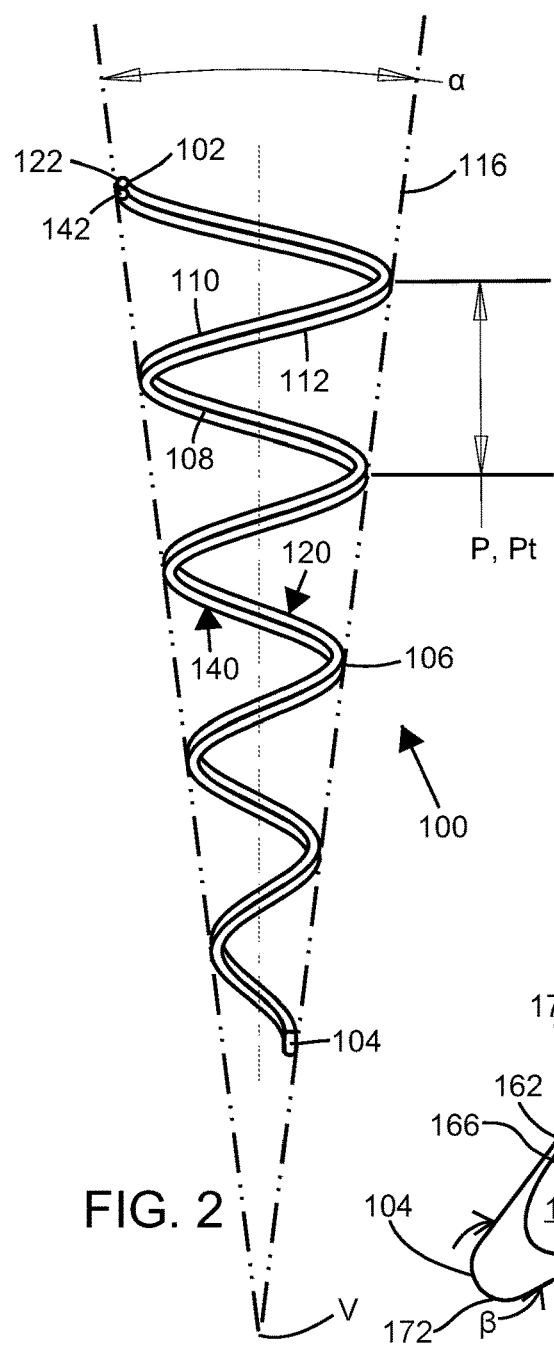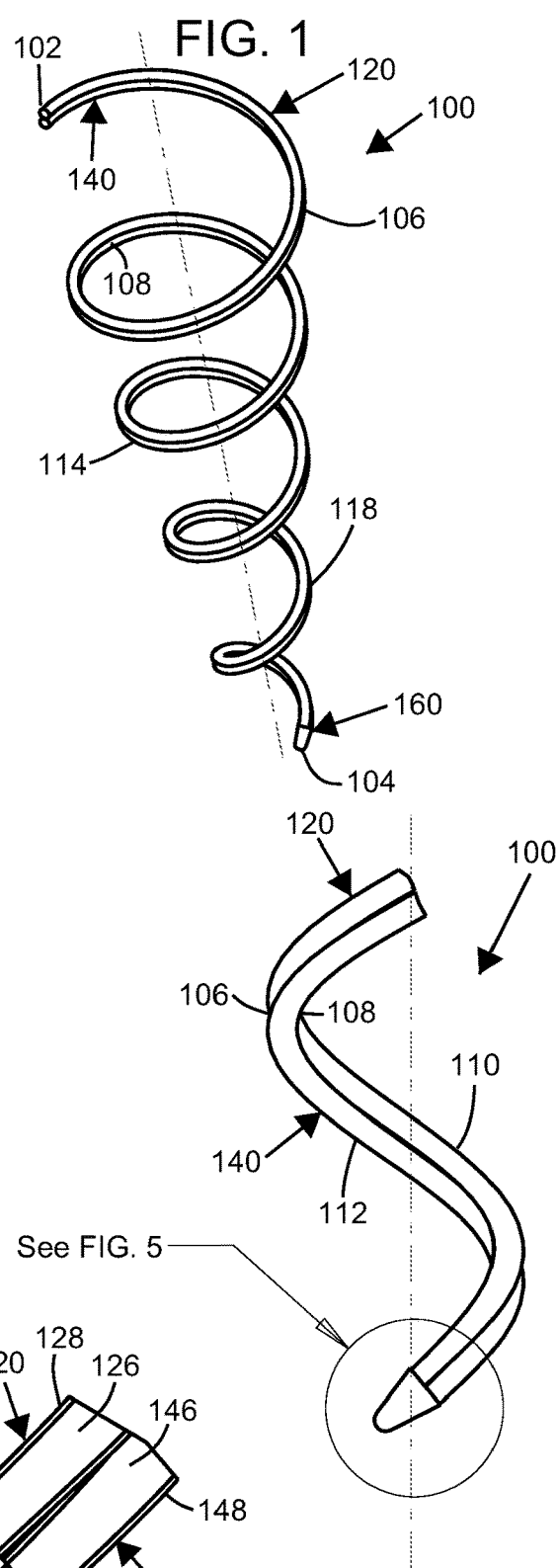

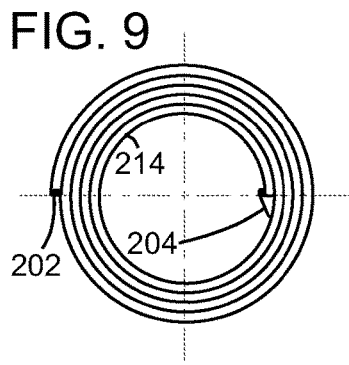
FIG. 9
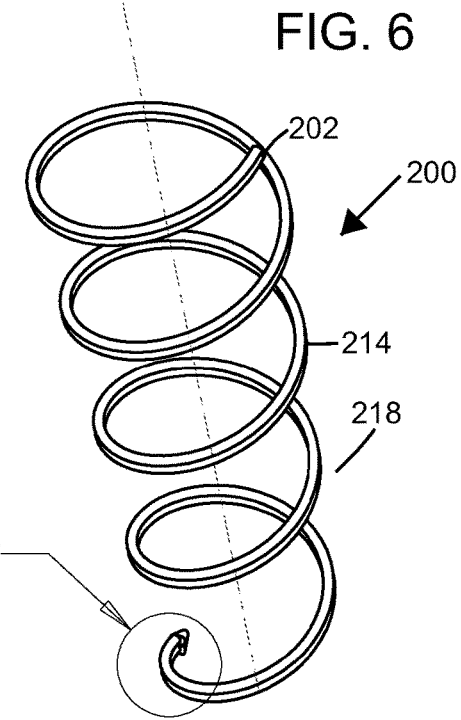
FIG. 6
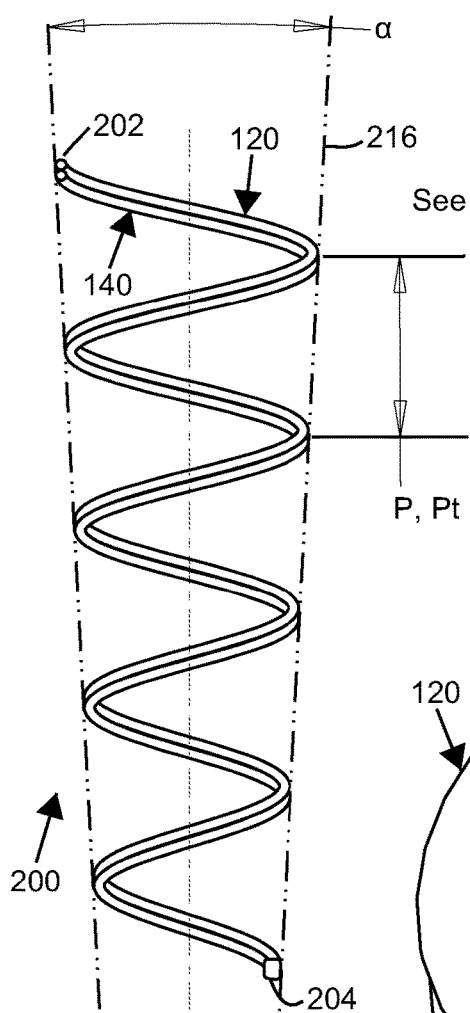
FIG. 8
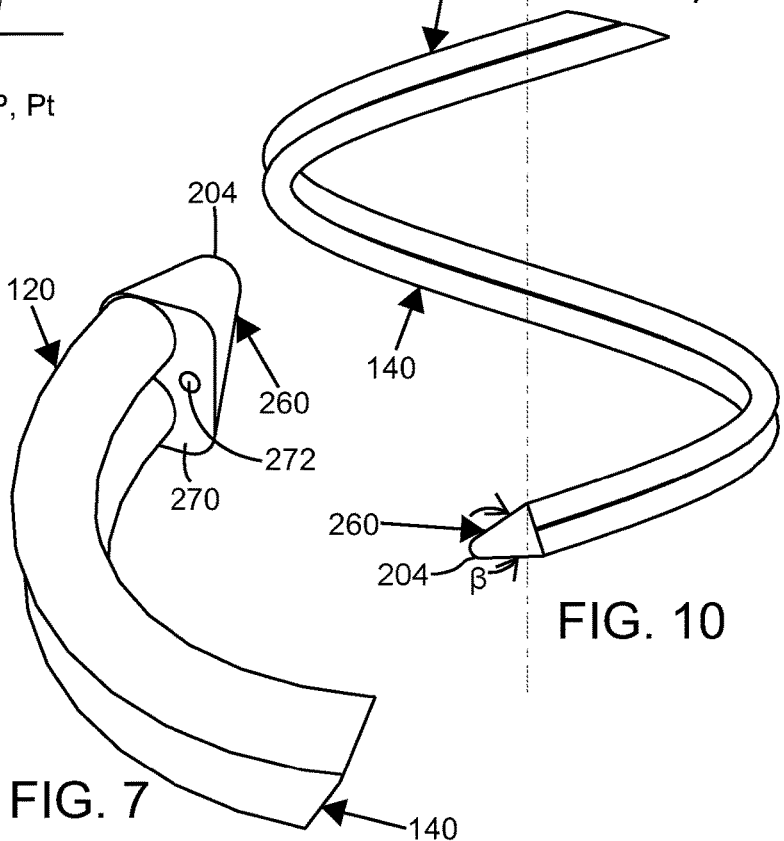
FIG. 7
FIG. 10

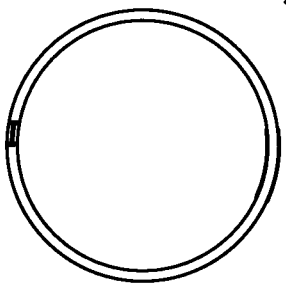
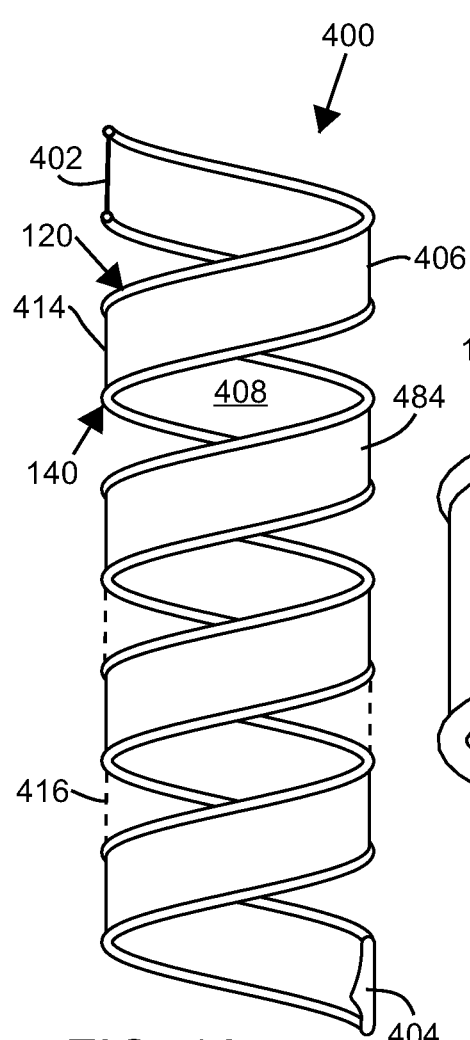
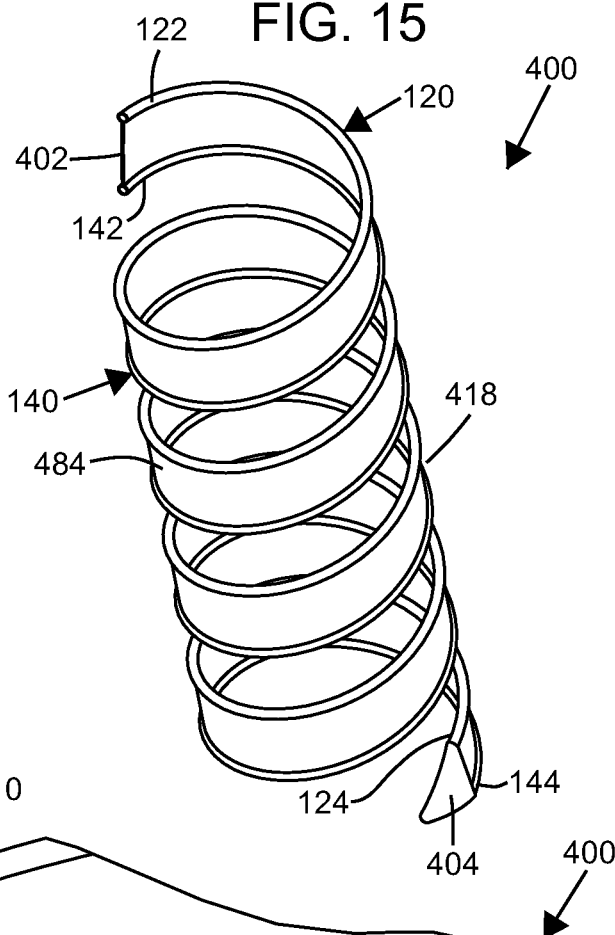
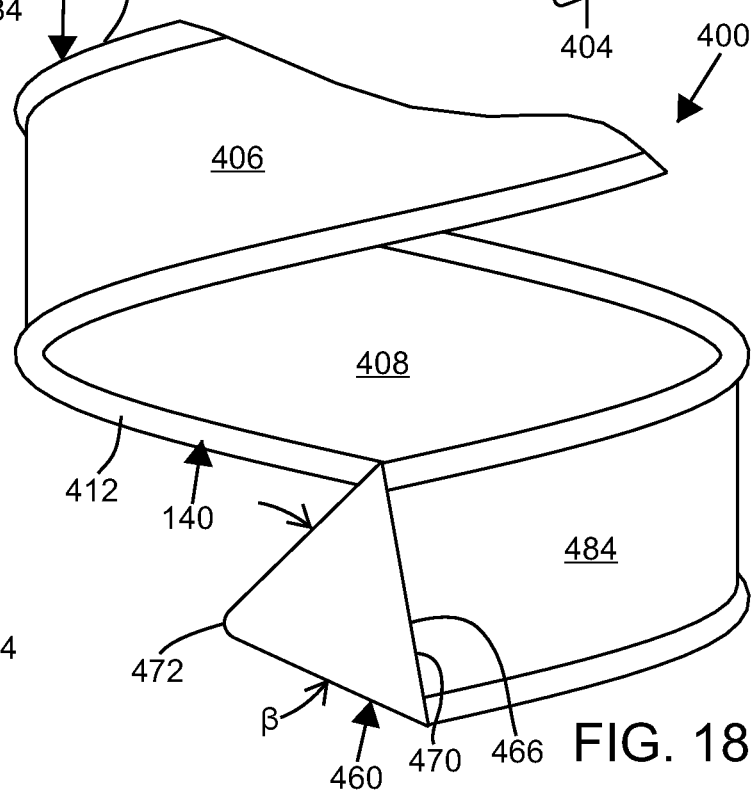

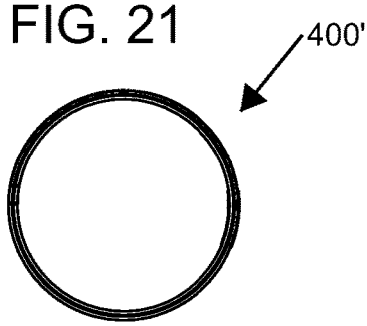
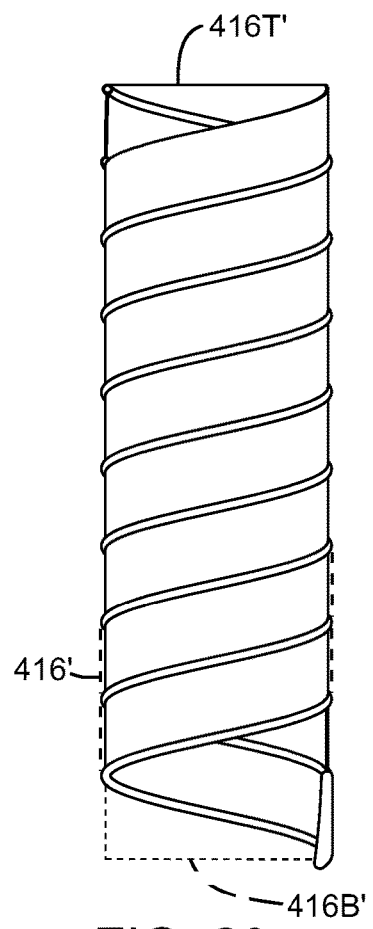
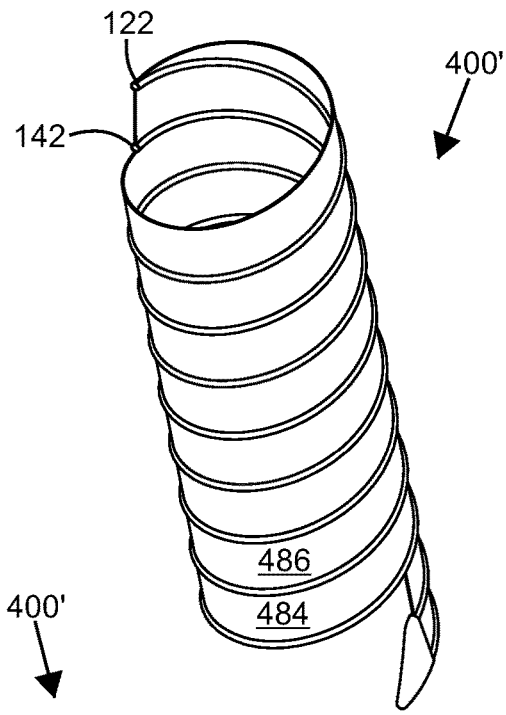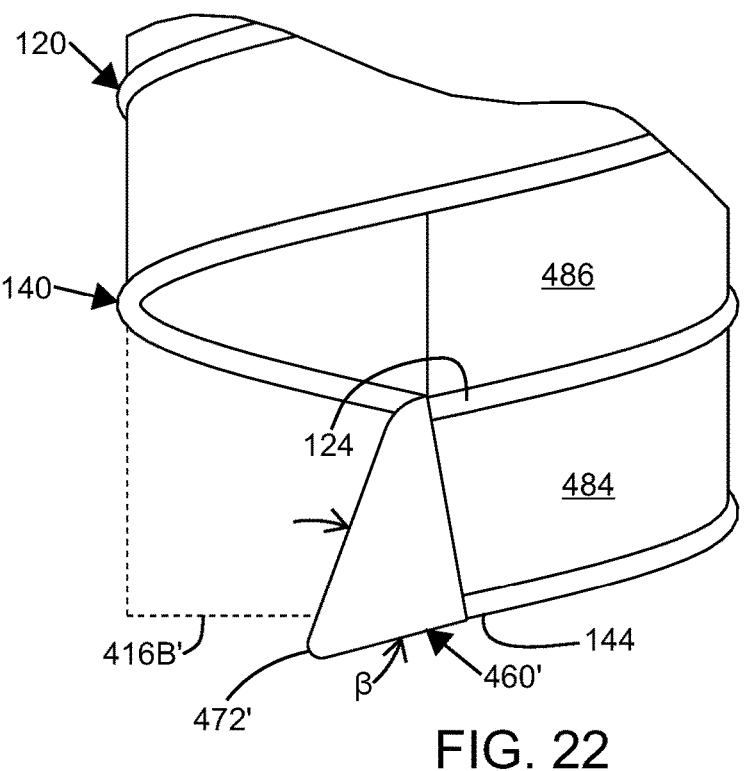

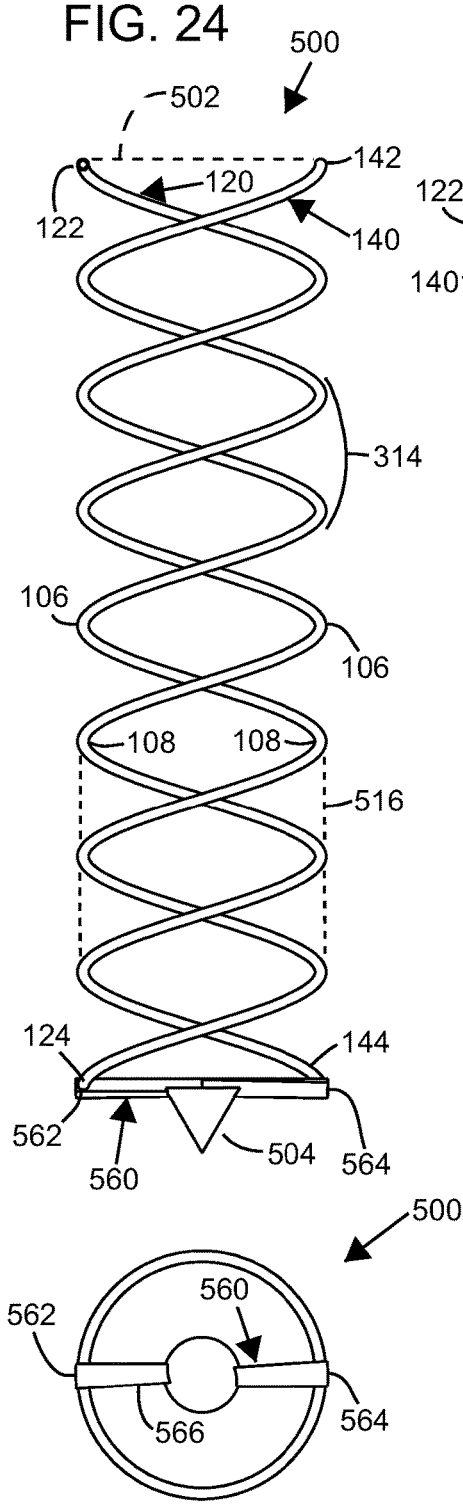
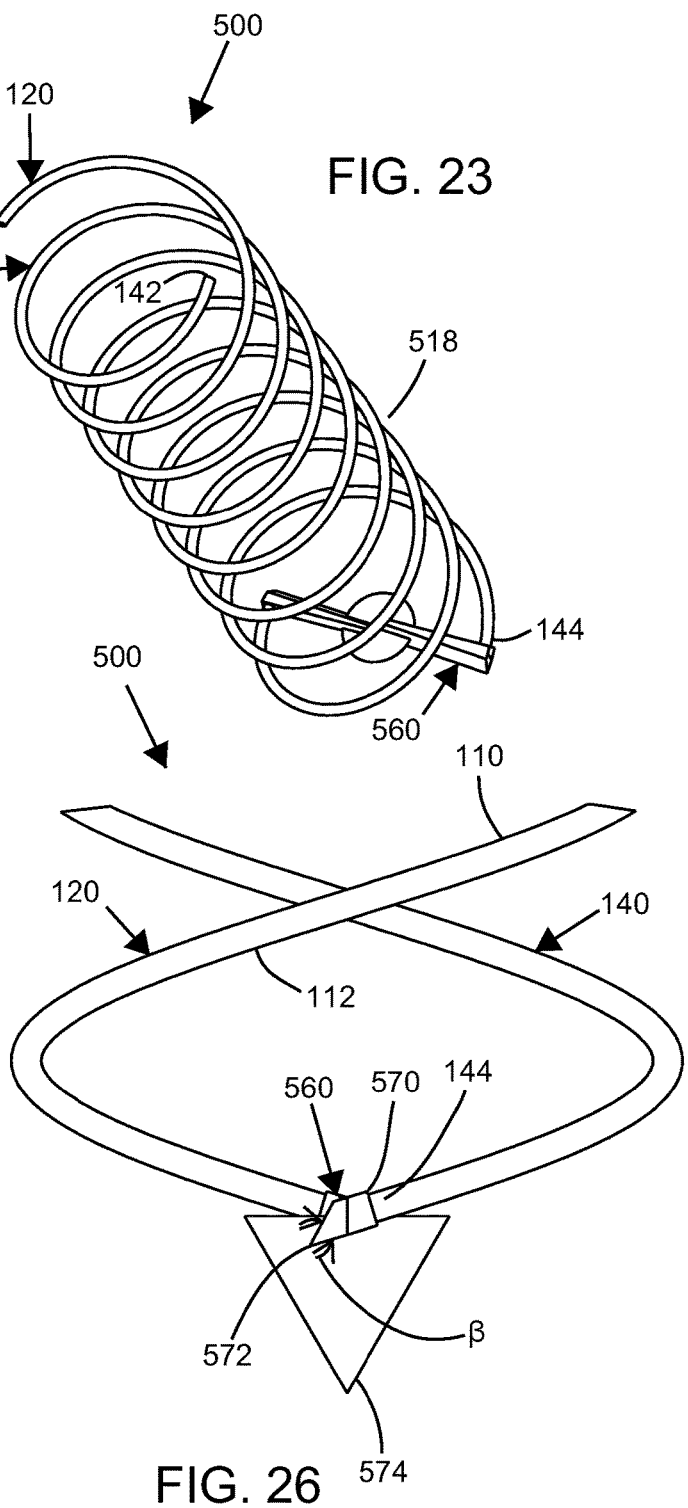

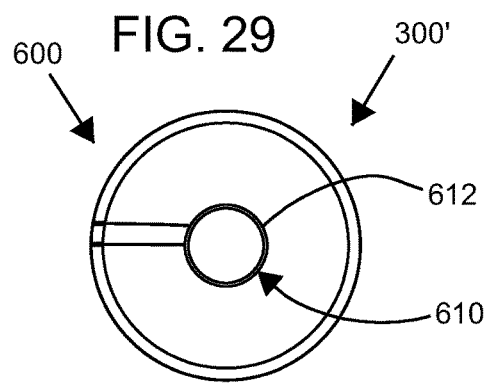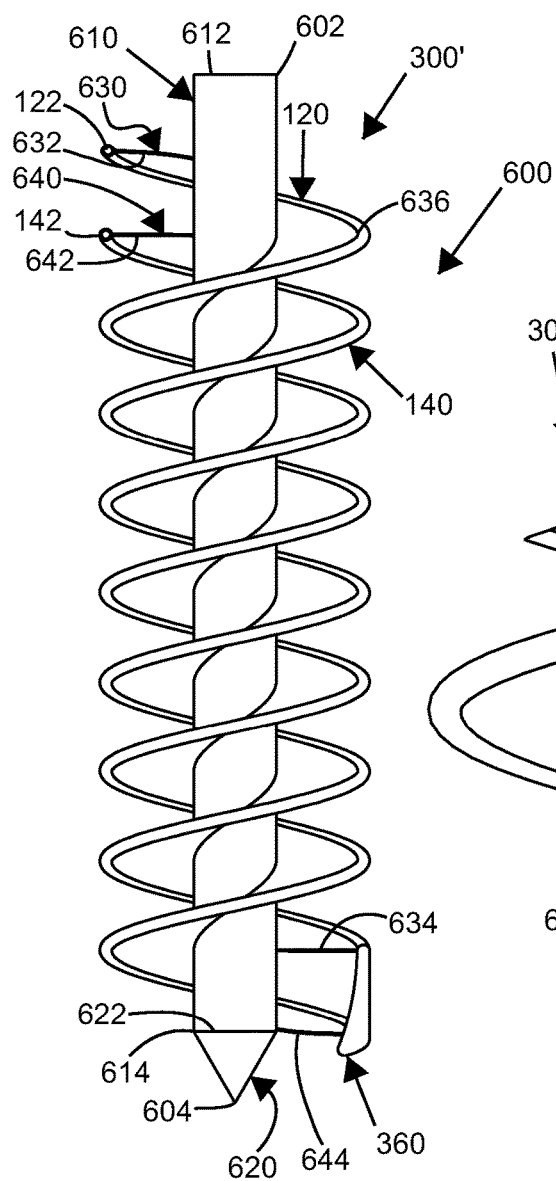
FIG. 29
FIG. 27
FIG. 28
FIG. 30

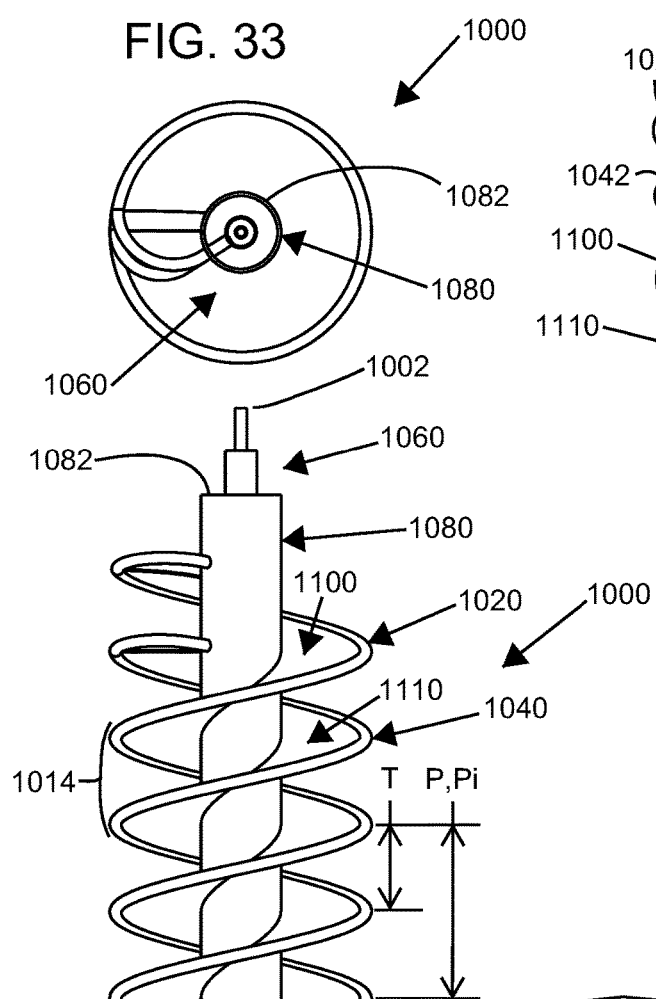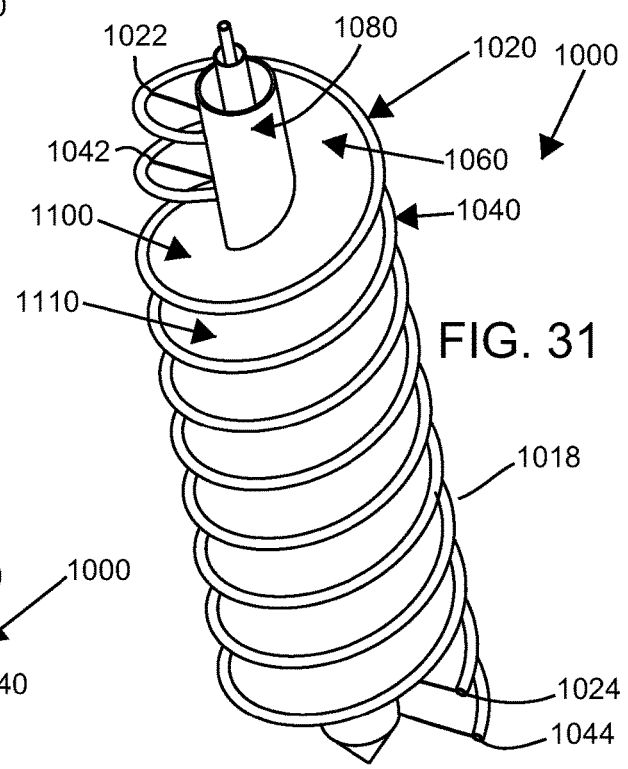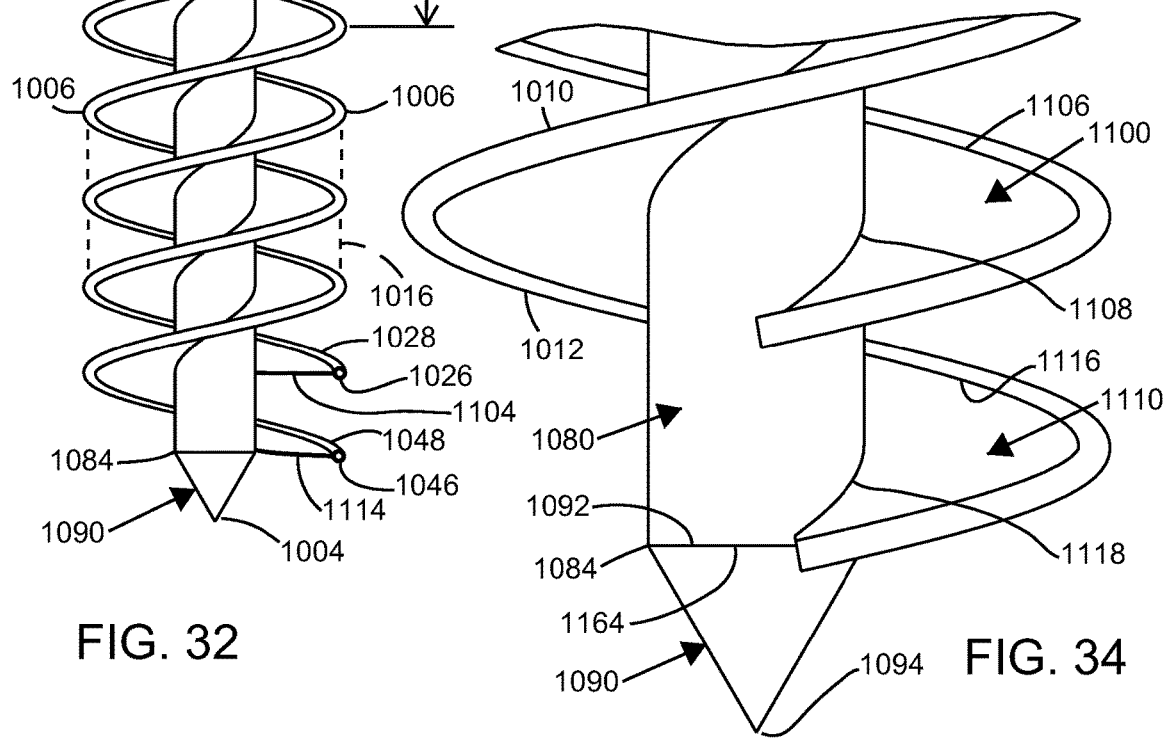

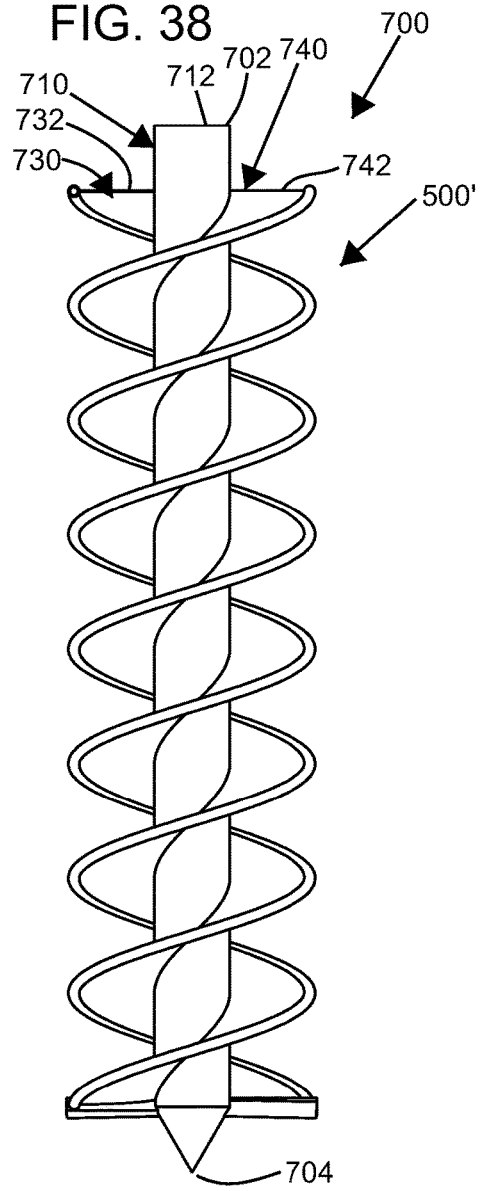
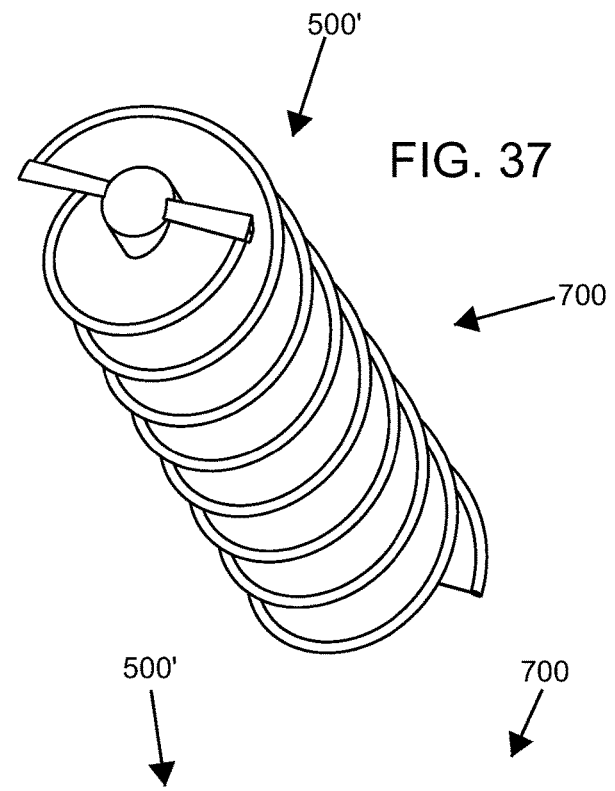
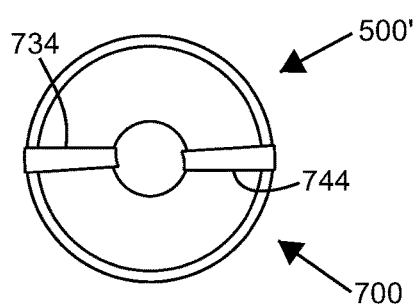
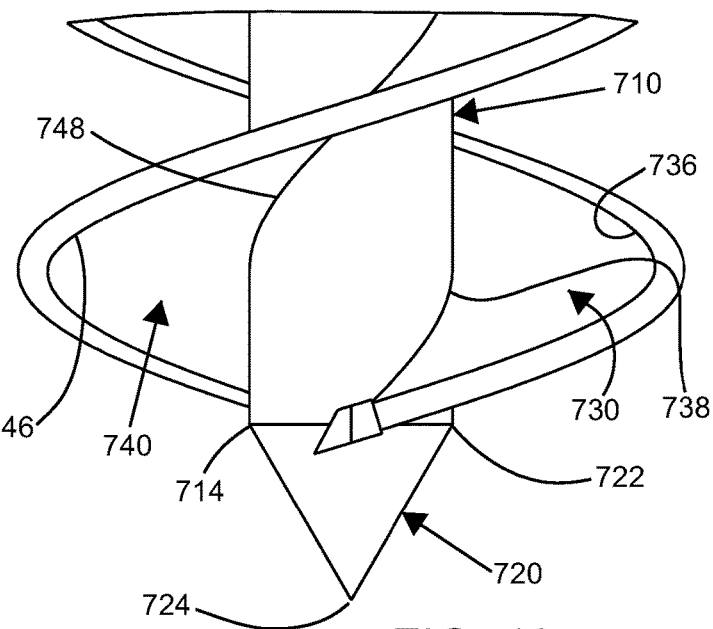
FIG. 38
FIG. 37
FIG. 39
FIG. 40

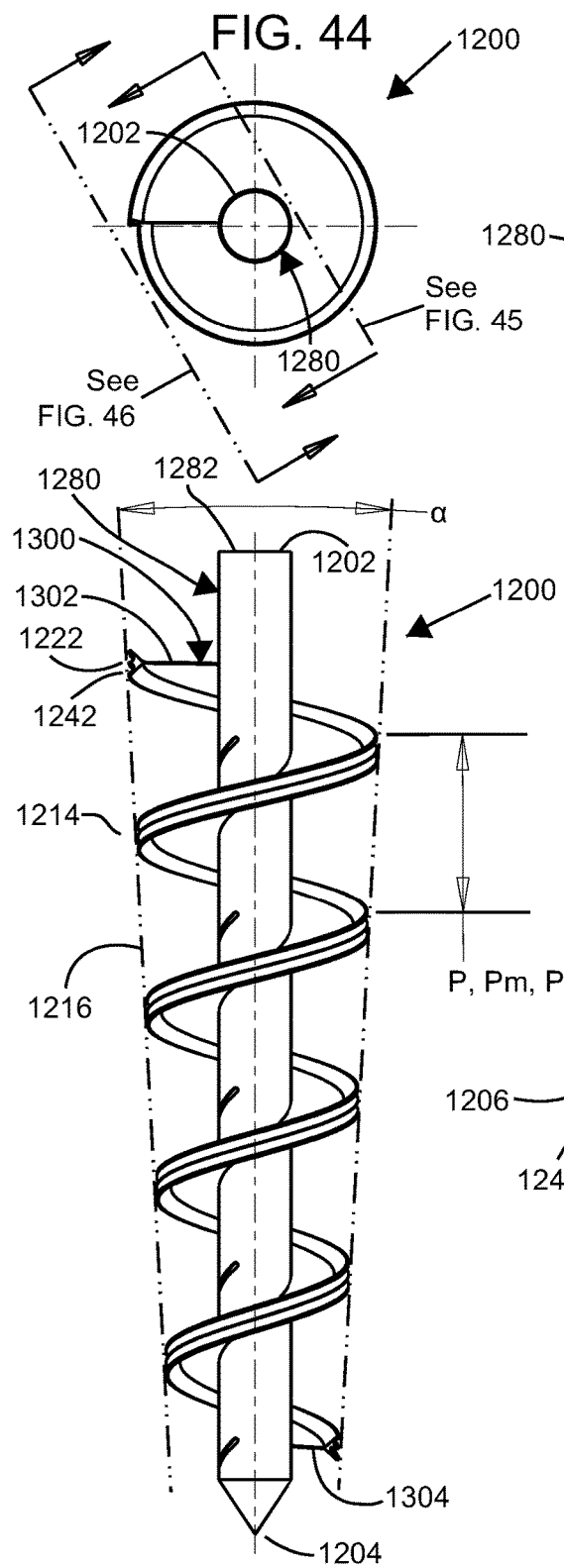
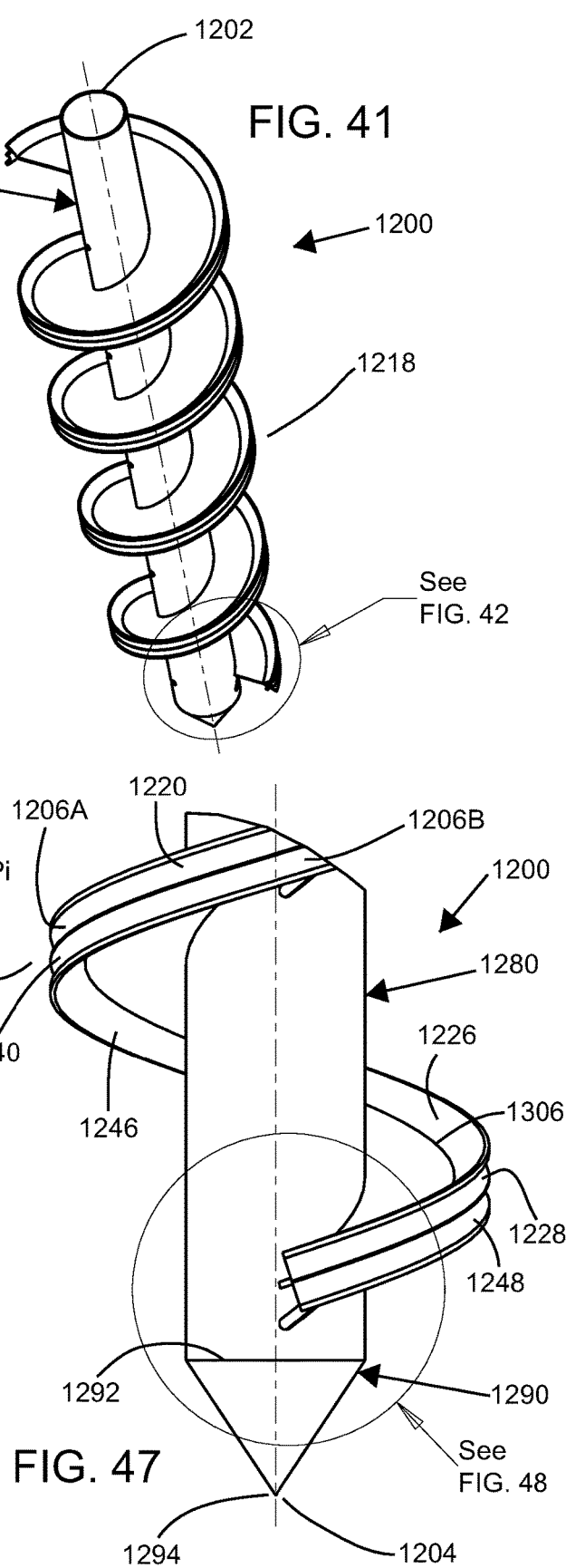
FIG. 44
FIG. 41
FIG. 43
FIG. 47

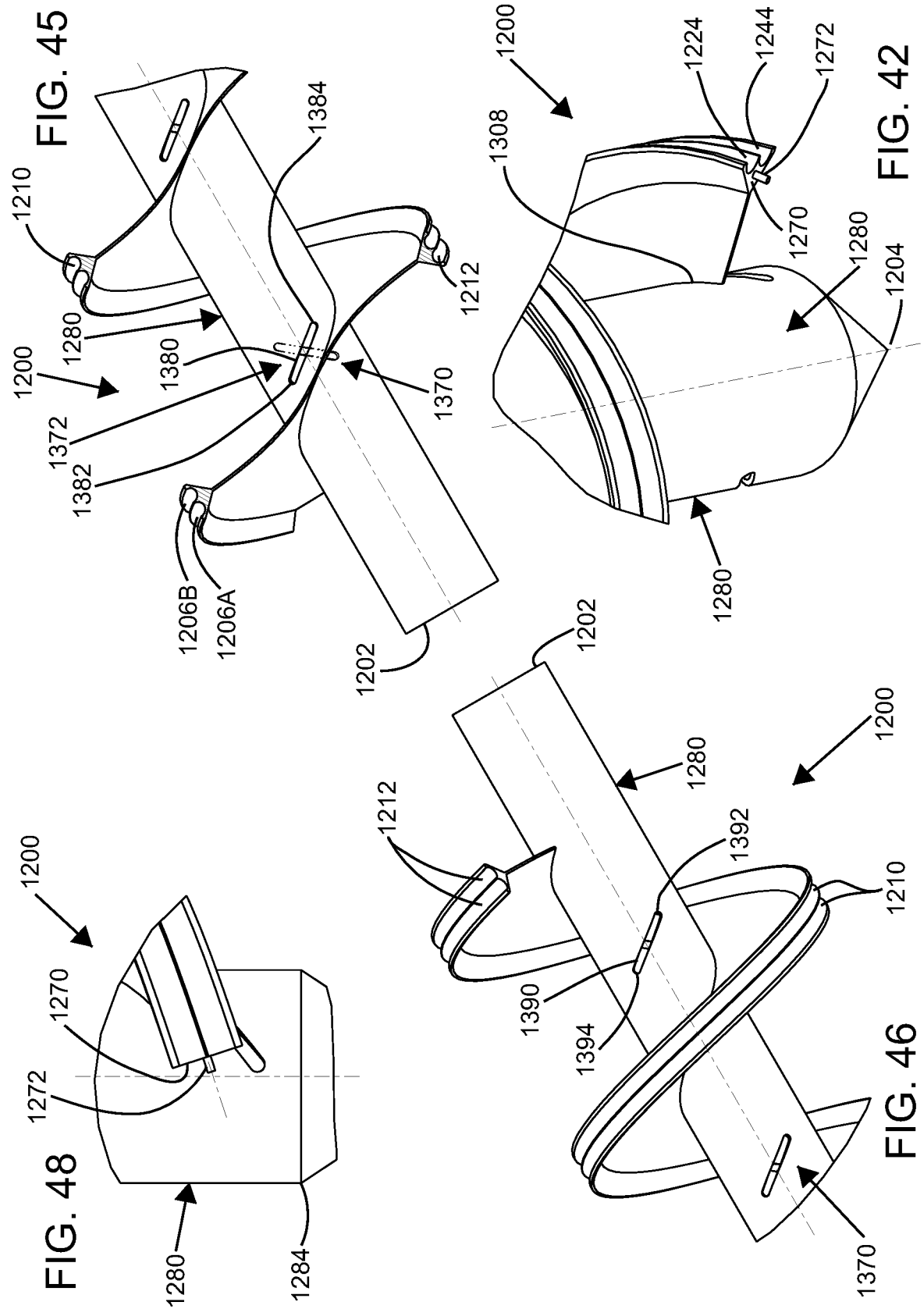

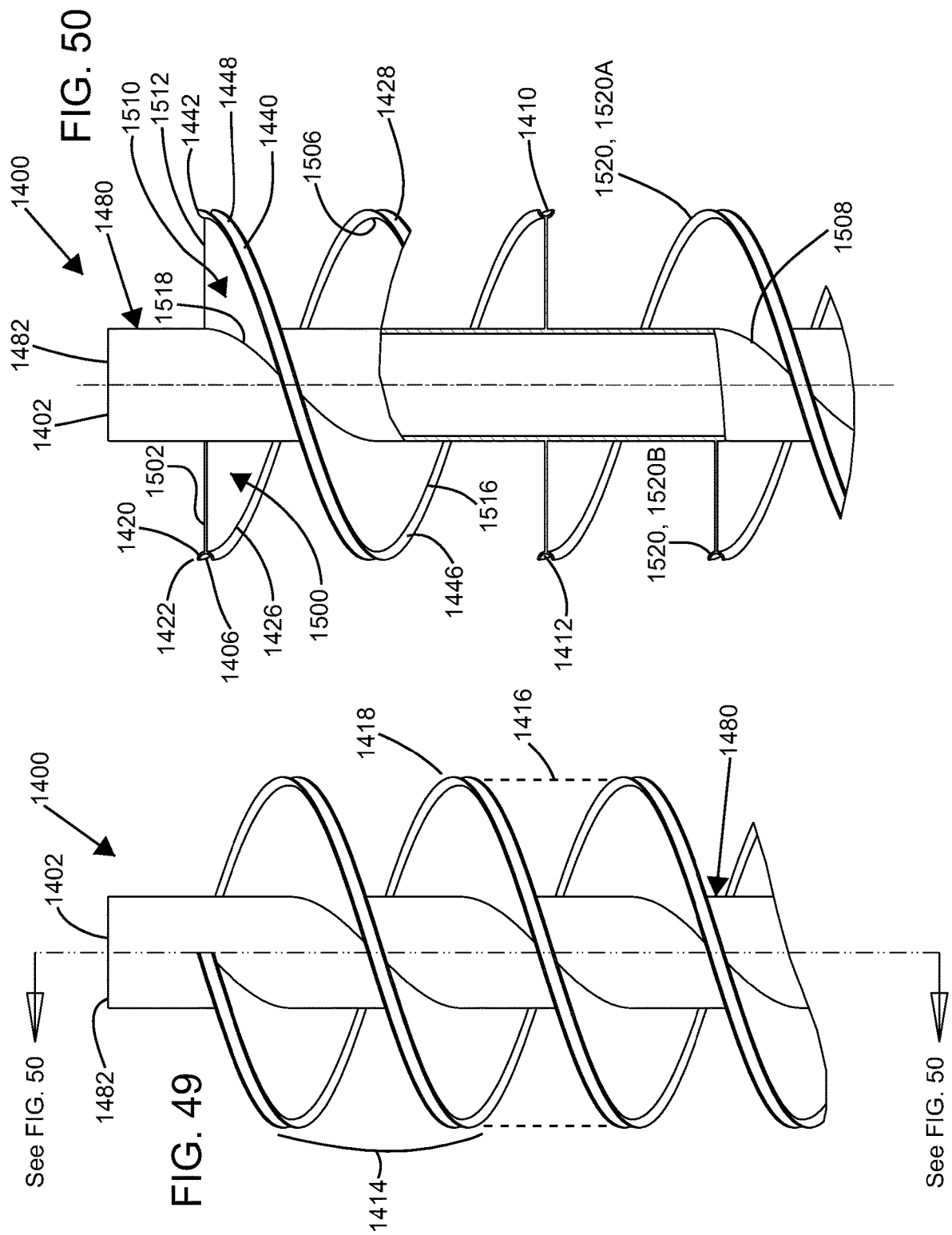

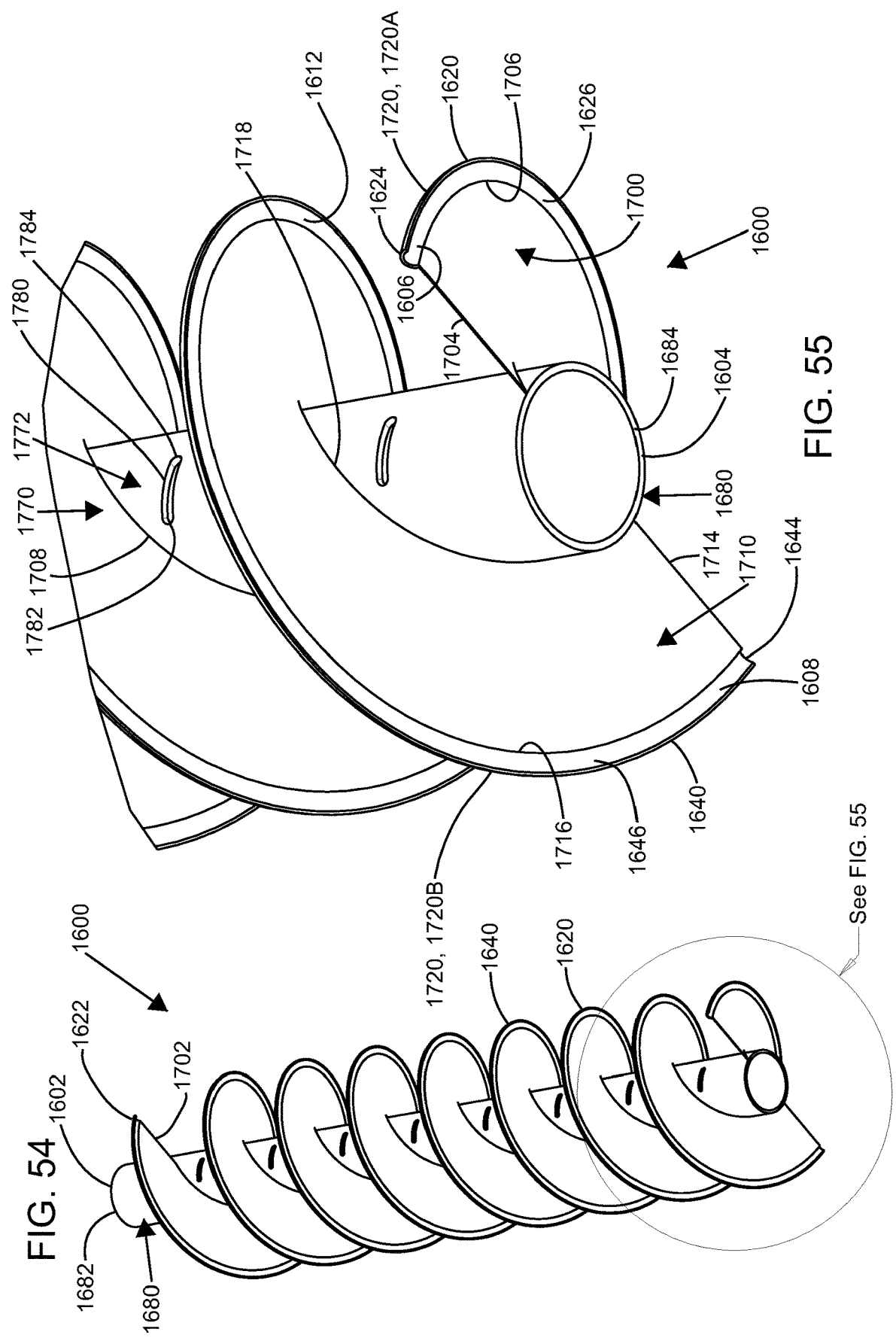

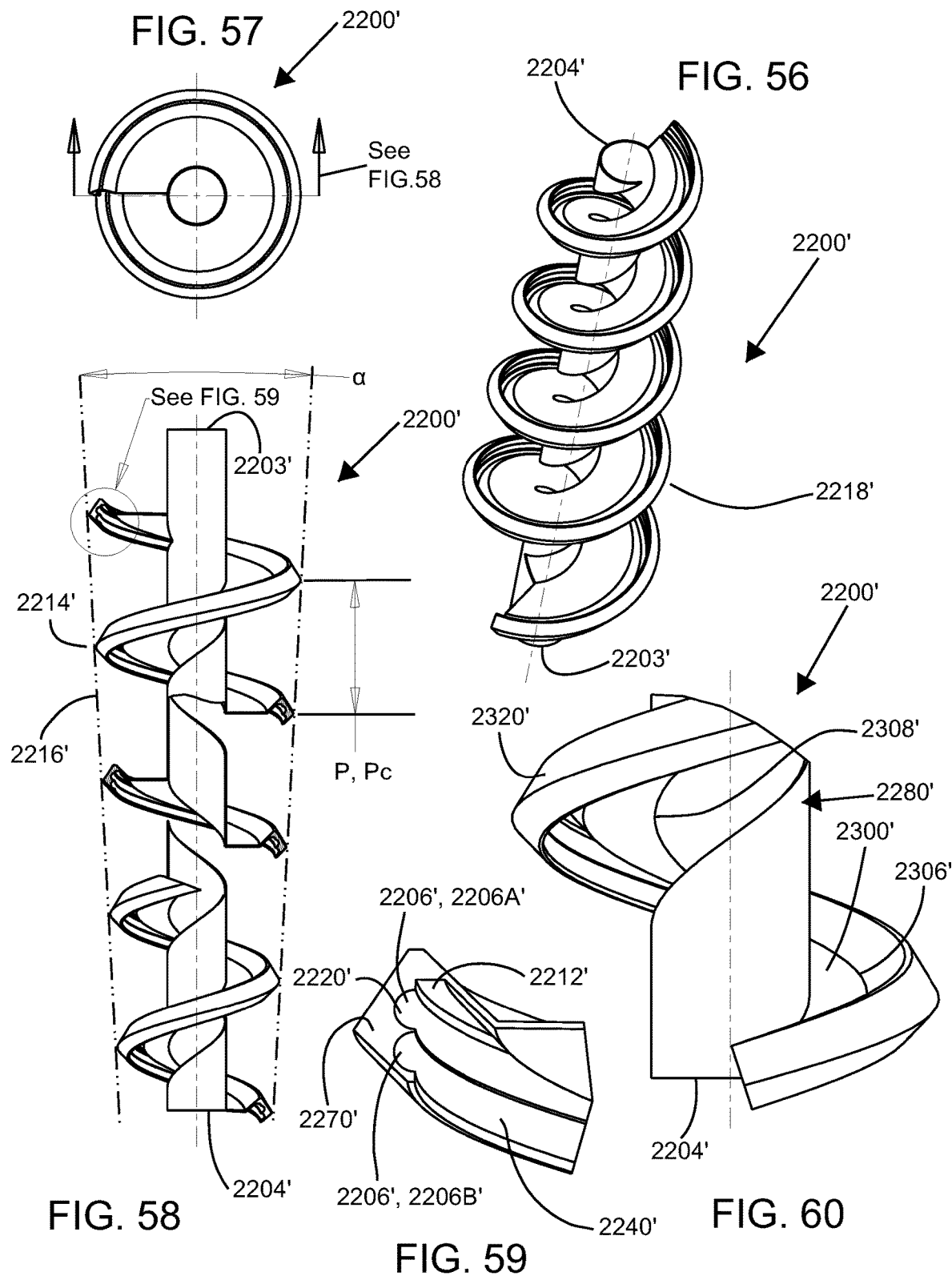

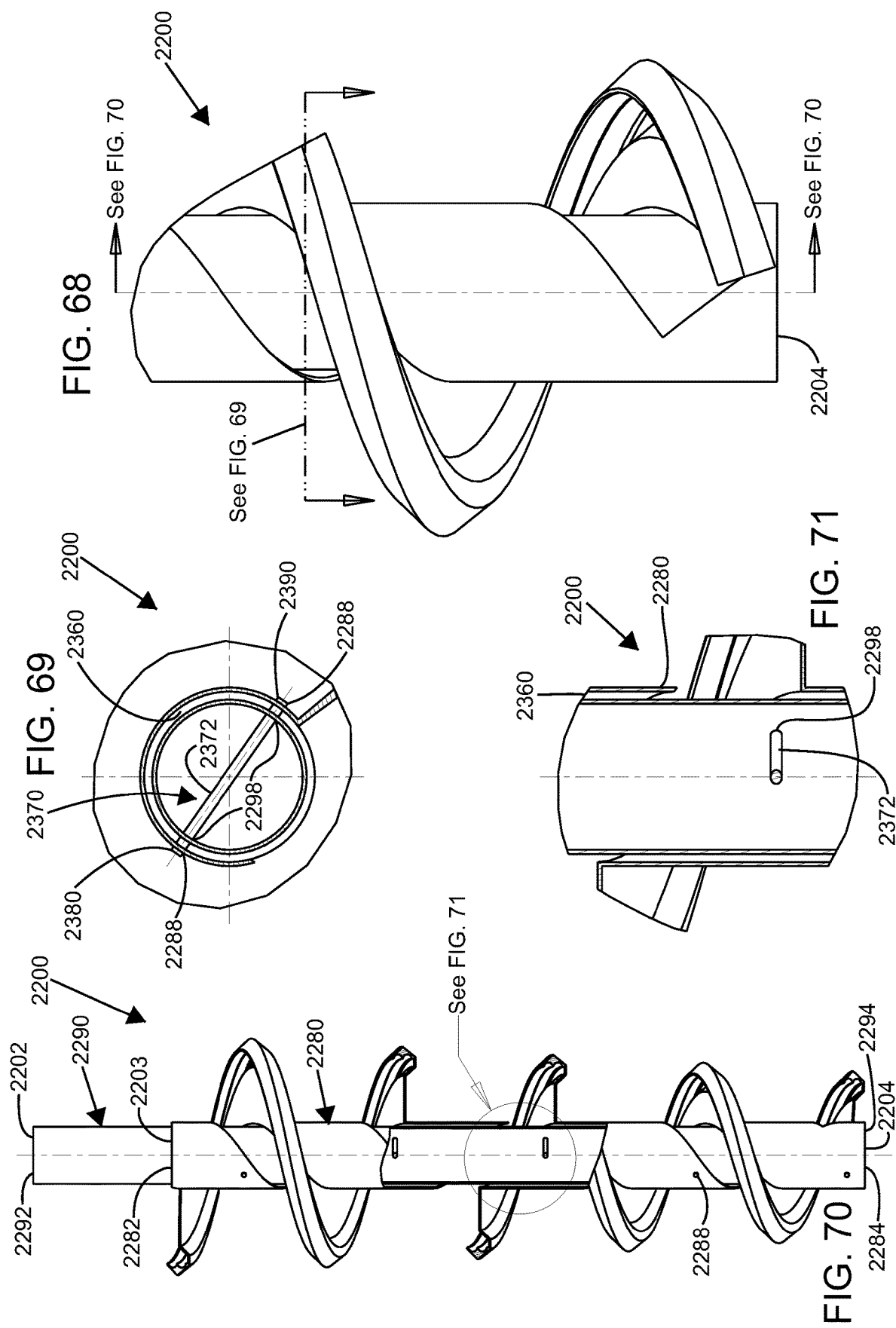

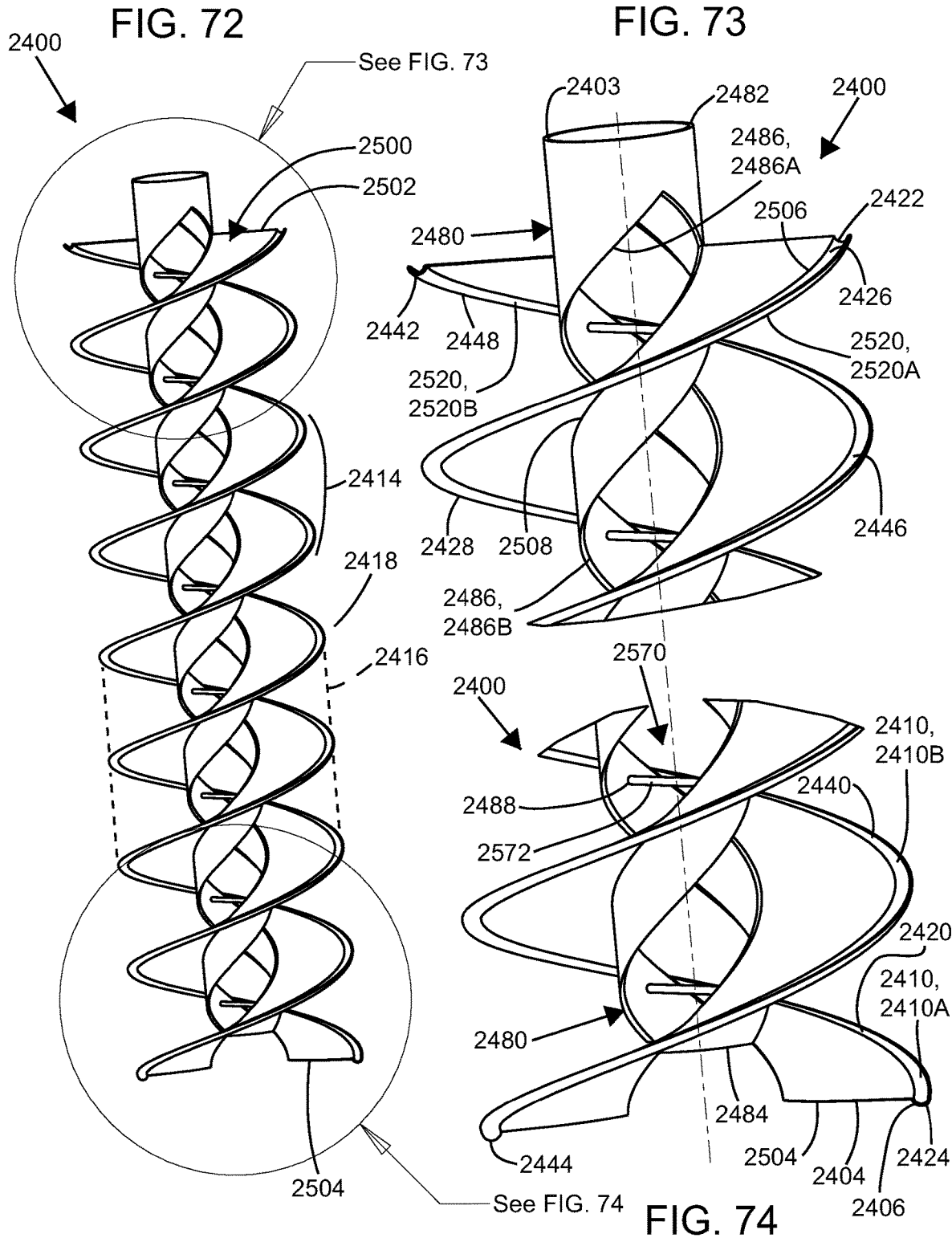

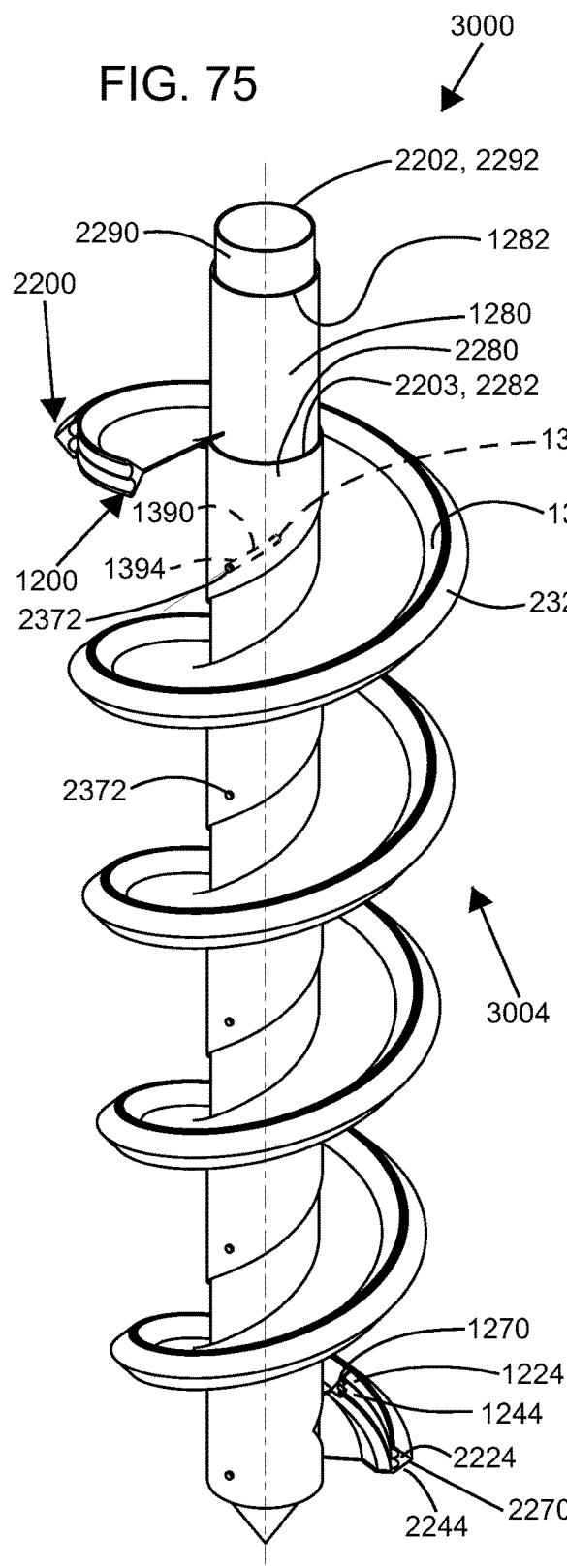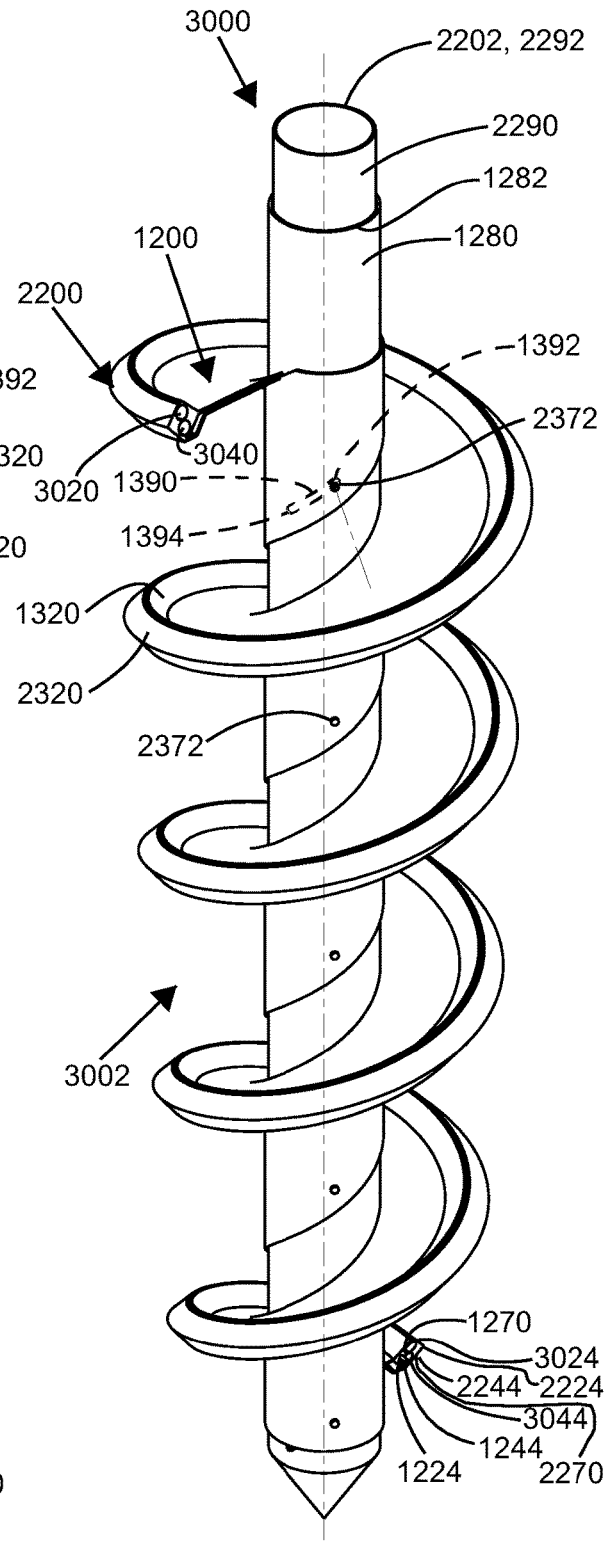

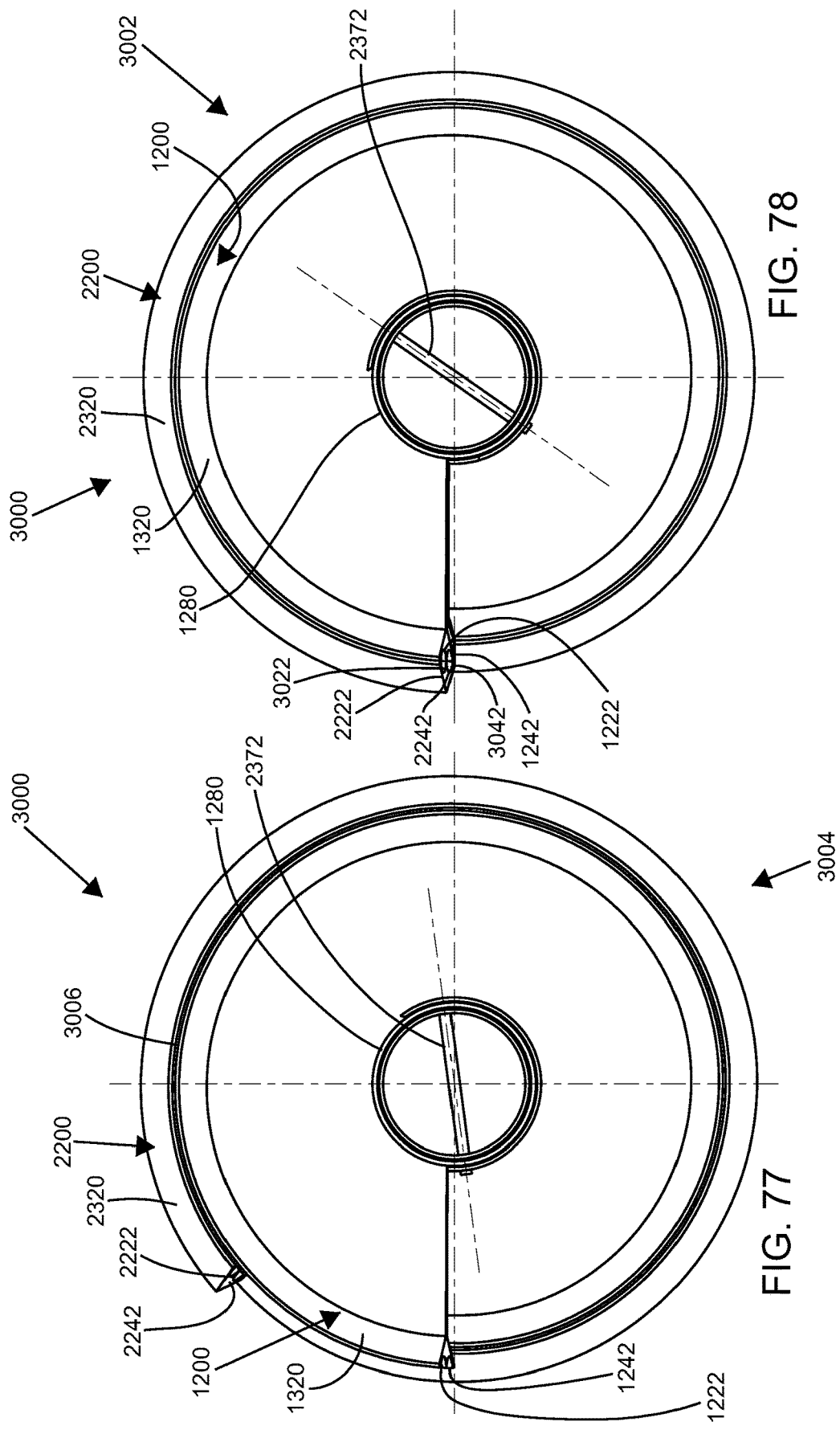

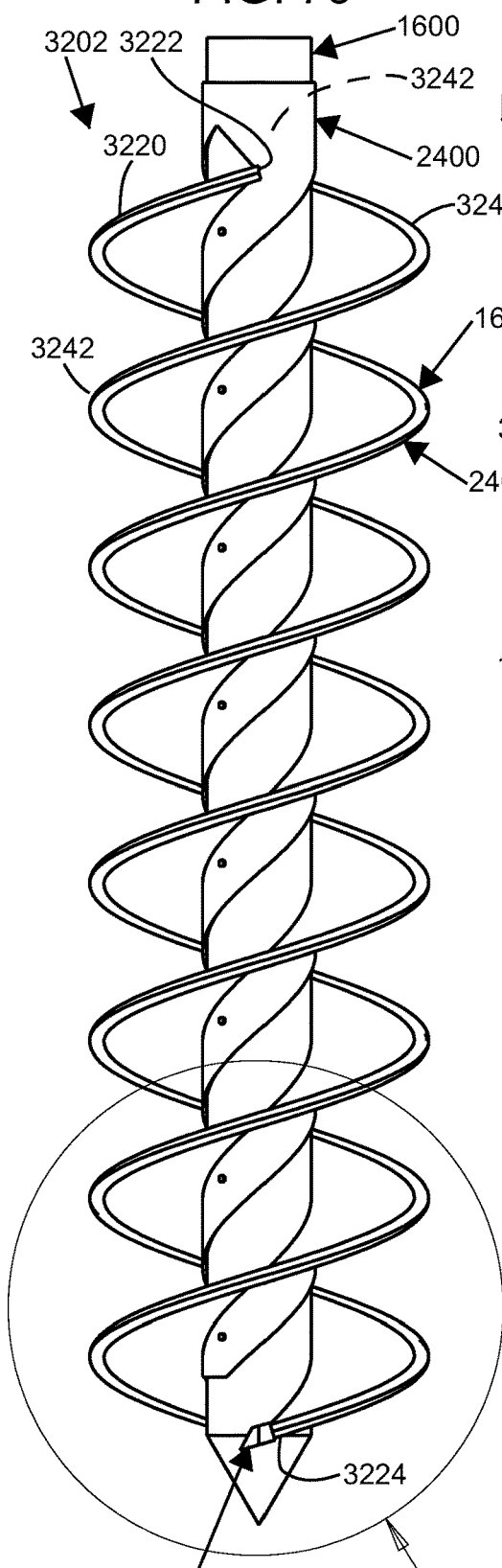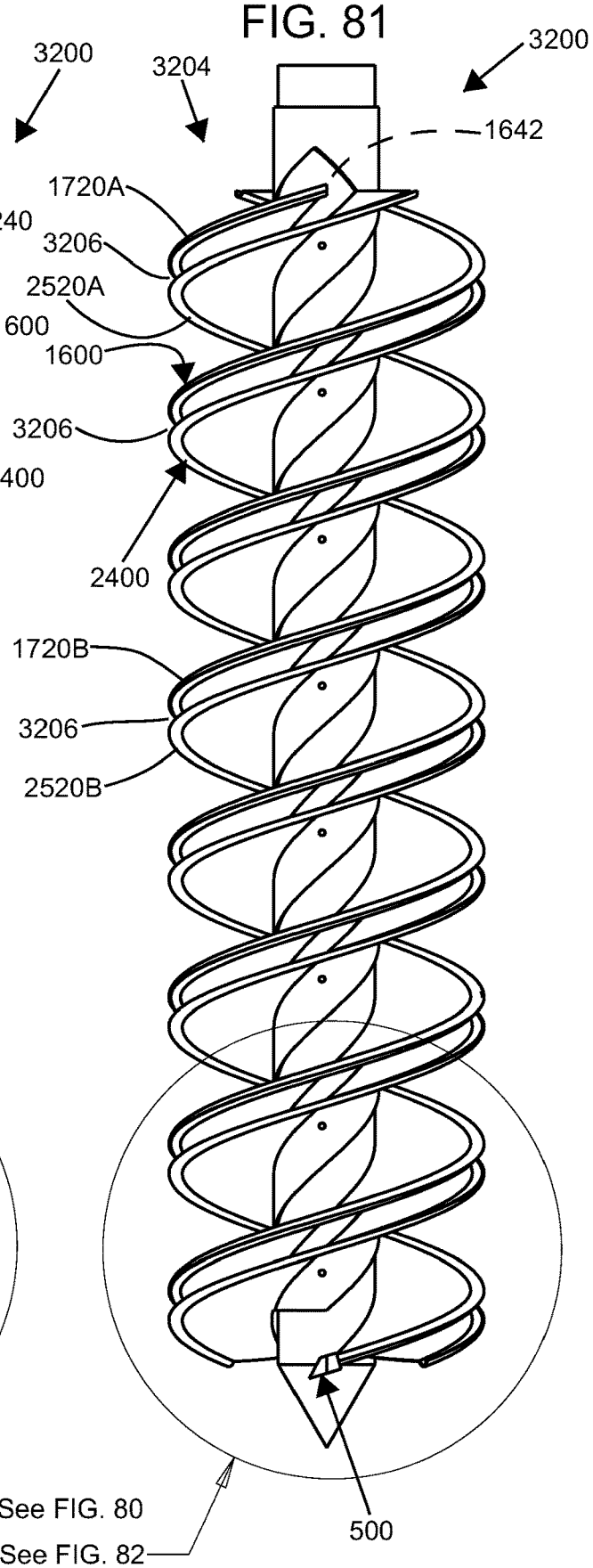

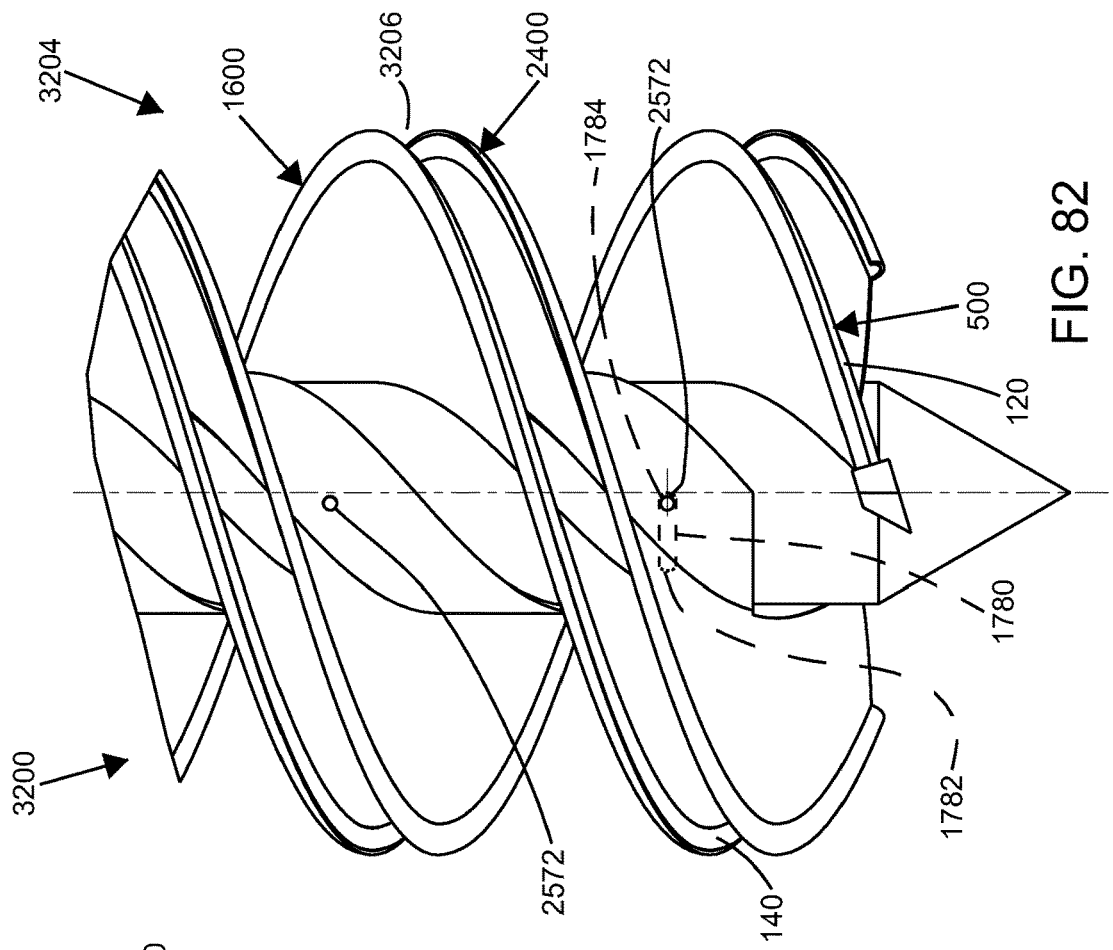
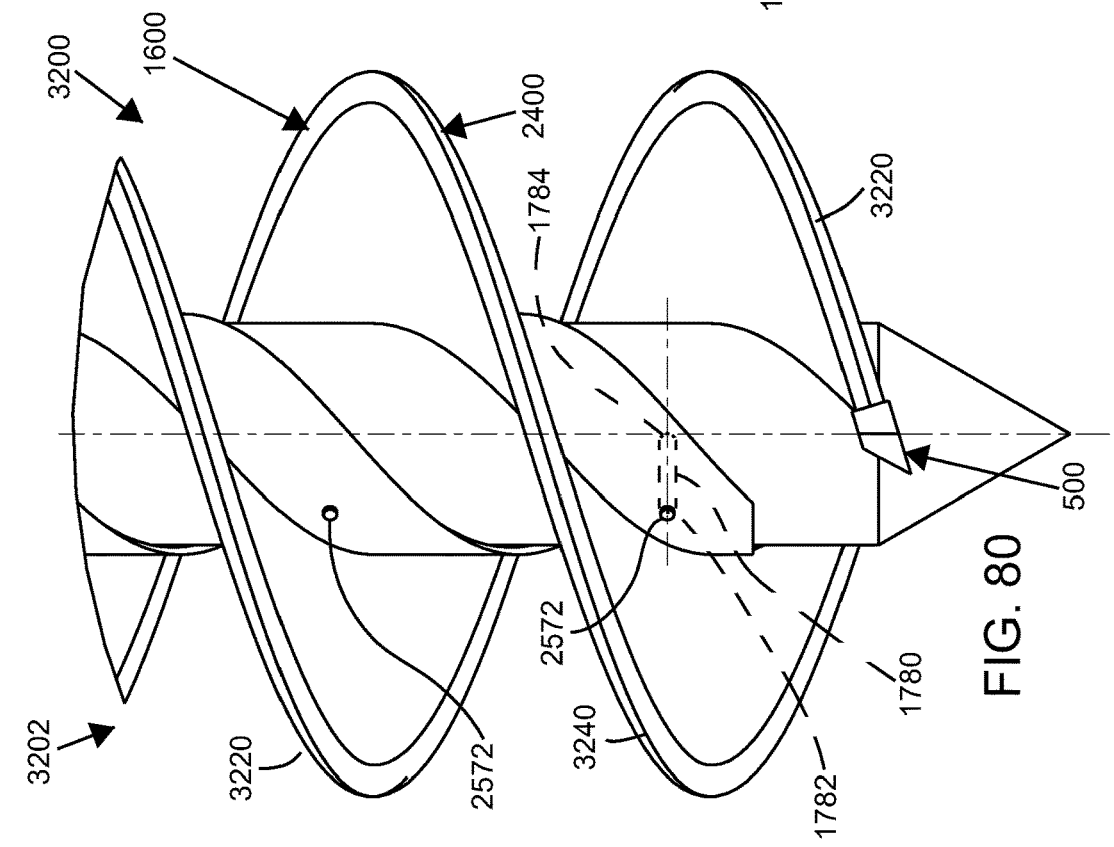

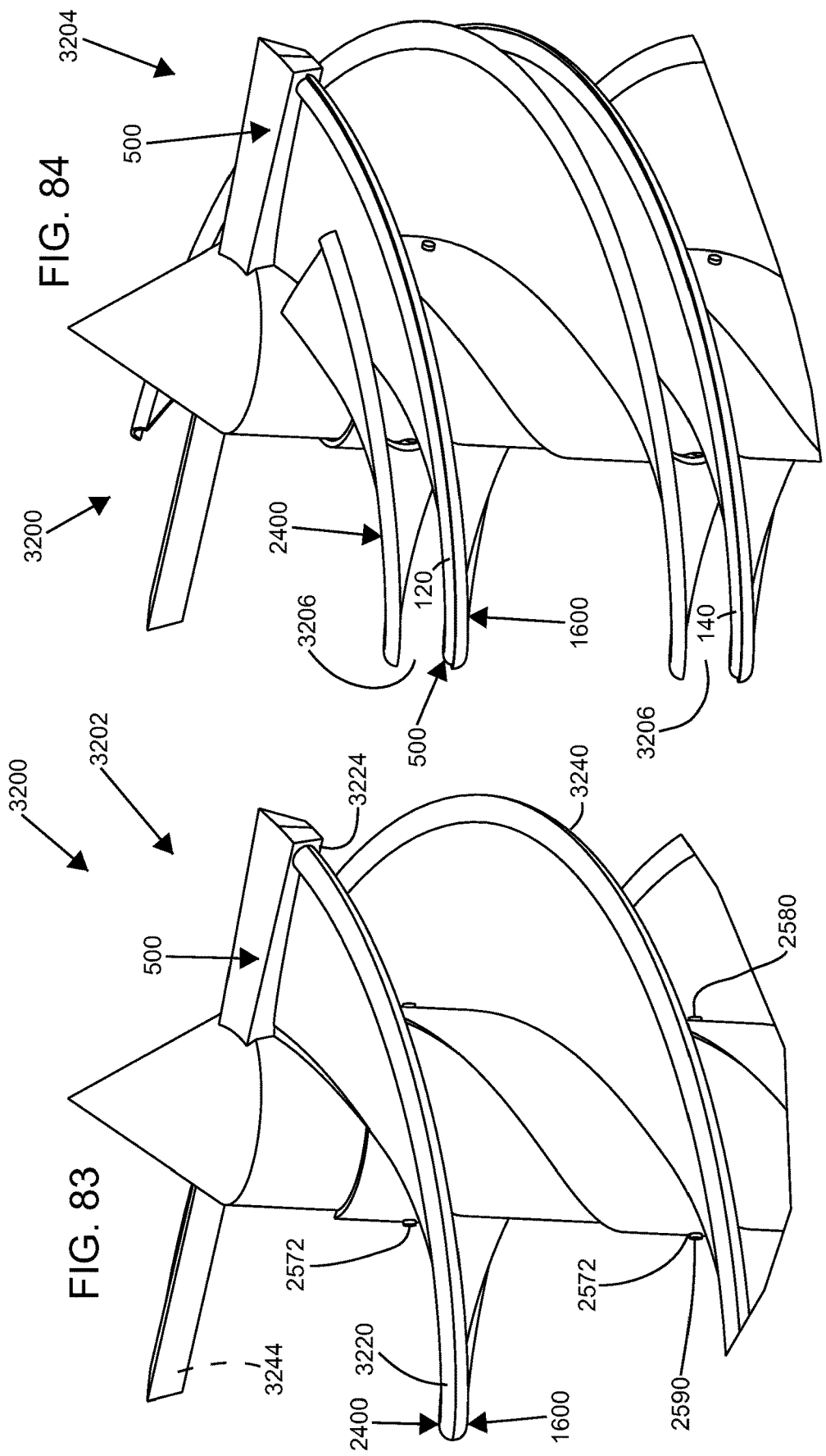

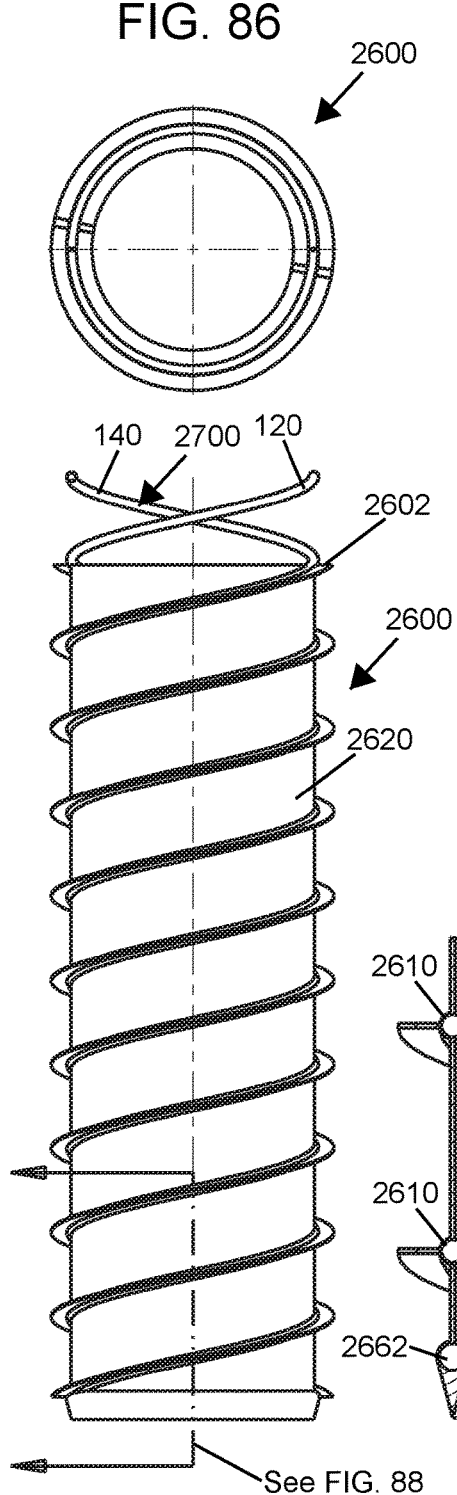
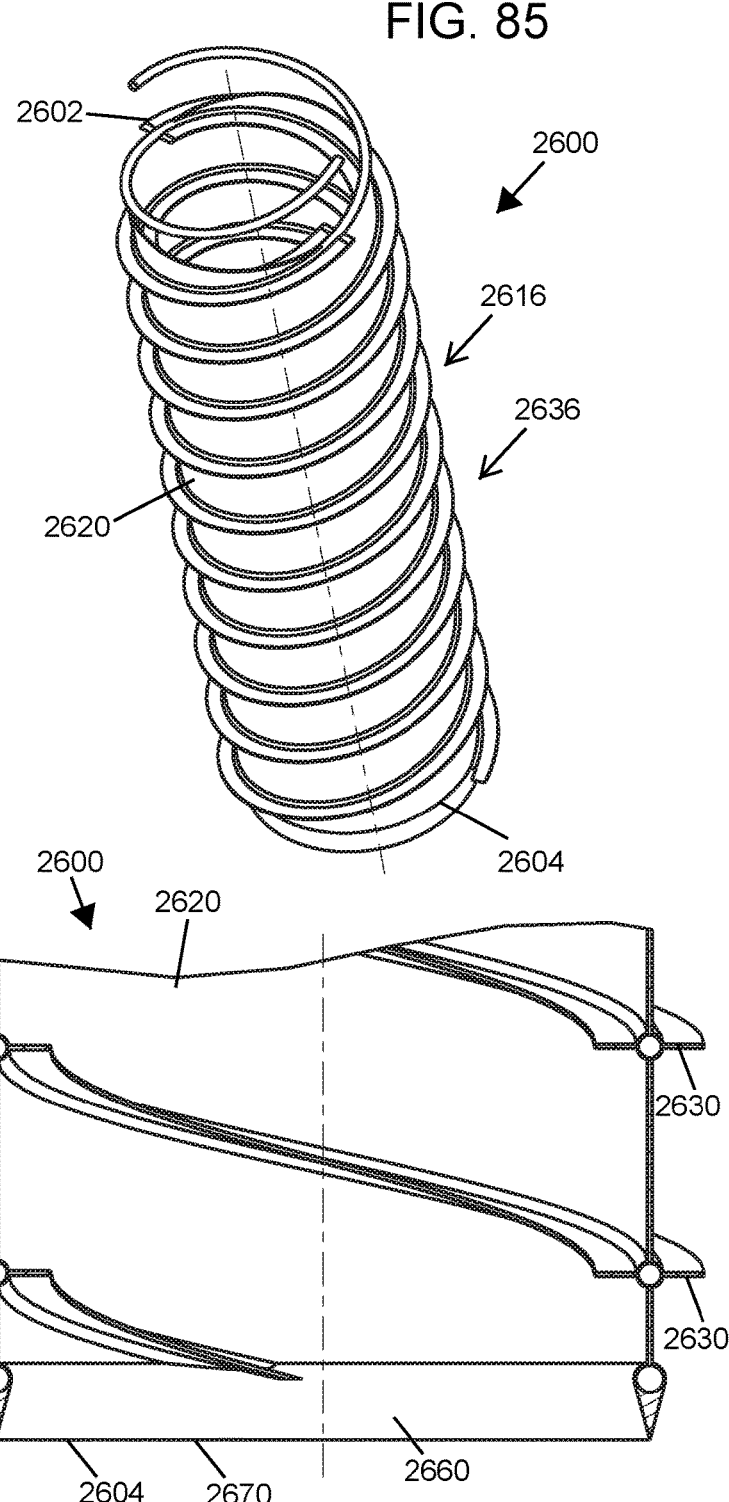
FIG. 86
FIG. 85
FIG. 87
FIG. 88

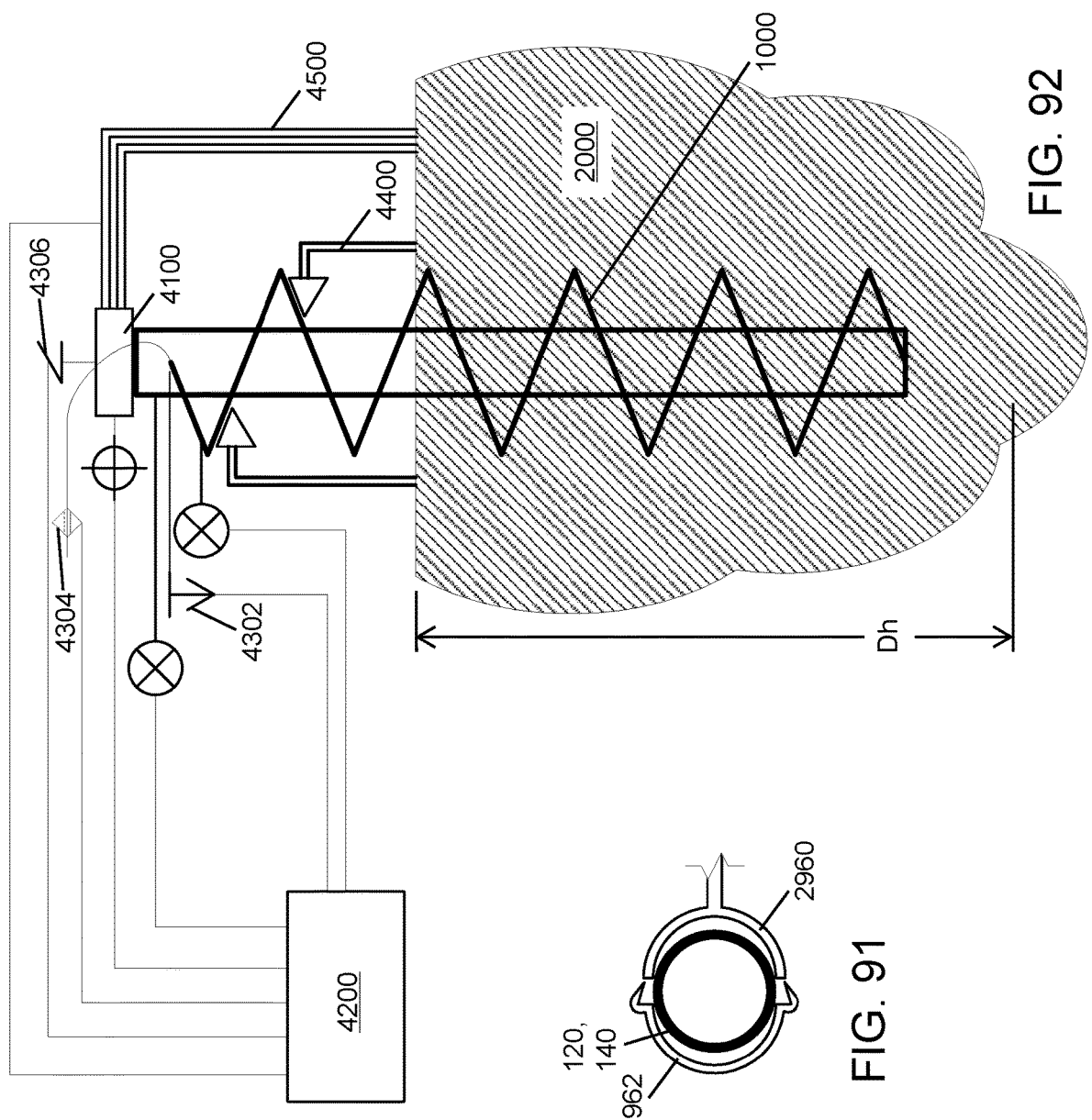
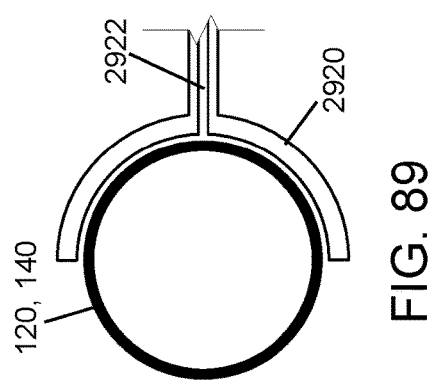
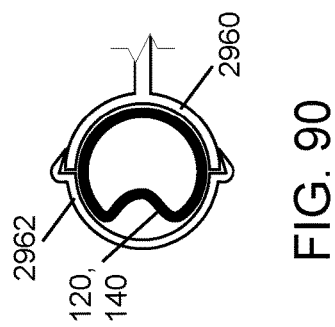
FIG. 89
FIG. 90
FIG. 91
FIG. 92

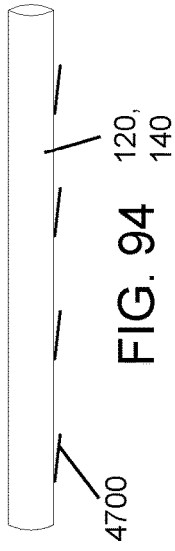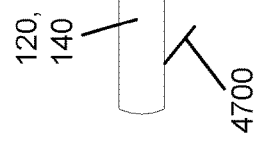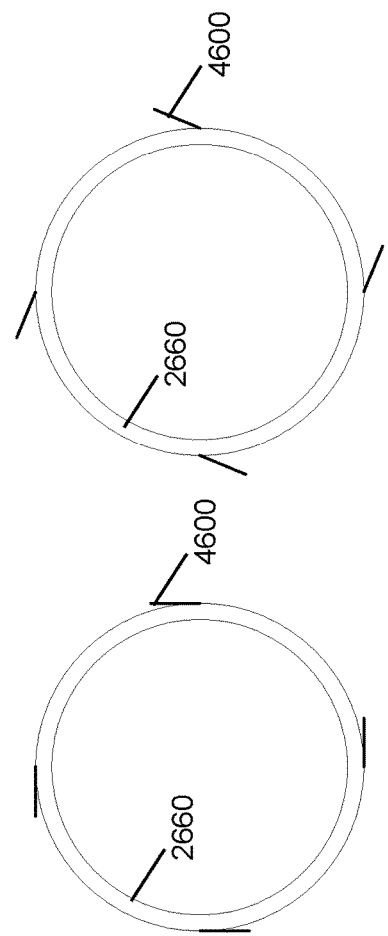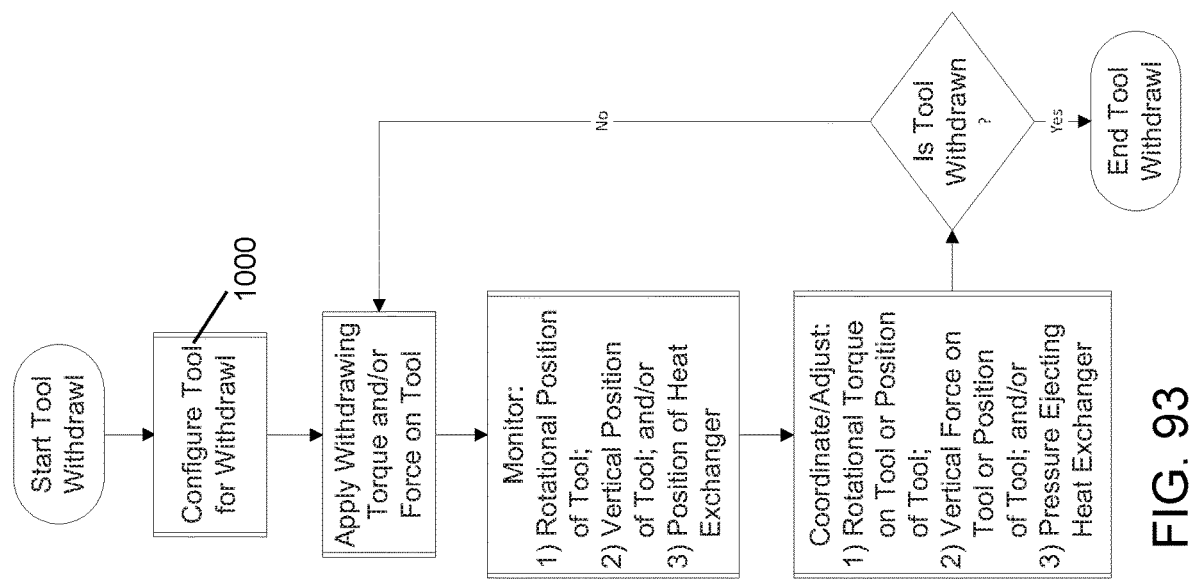

INSTALLATION APPARATUS/TOOL FOR TUBULAR GEOTHERMAL HEAT EXCHANGER SYSTEMS AND METHODS

CROSS REFERENCE TO RELATED APPLICATIONS

The present application is a continuation of U.S. patent application Ser. No. 14/214,938, entitled SCREW-IN GEOTHERMAL HEAT EXCHANGER SYSTEMS AND METHODS, and filed on Mar. 15, 2014, which claims the benefit of U.S. Provisional Patent Application Ser. No. 61/801,639, entitled SCREW-IN GEOTHERMAL HEAT EXCHANGER SYSTEMS AND METHODS, and filed on Mar. 15, 2013, the disclosures of which are hereby incorporated by reference in their entireties.

BACKGROUND

Geothermal heat pumps have been developed that extract heat energy from soil and transfer the heat energy from the soil into a residential or commercial building and thereby heat the building in cool ambient conditions. The geothermal heat pumps can also be used to transfer heat from the building to the soil and thereby cool the building during periods of high ambient heat. A significant cost in installing such geothermal heat pumps is the cost of installation of the heat exchanger in the soil. Various methods currently in use include boring a hole in the soil and inserting a geothermal heat exchanger into the bore hole. The bore hole may further be filled in with grout. Other methods for installing such geothermal heat exchangers include digging a trench, laying the heat exchanger in the trench and then backfilling the trench.

SUMMARY

According to certain aspects of the present disclosure, a method of installing a tubular heat exchanger into soil includes providing the tubular heat exchanger and screwing the tubular heat exchanger into the soil with an installation apparatus. The installation apparatus may be removed from the soil without removing the tubular heat exchanger from the soil.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 1 is a perspective view of a screw-in geothermal heat exchanger according to the principles of the present disclosure;

FIG. 2 is an elevation view of the screw-in geothermal heat exchanger of FIG. 1;

FIG. 3 is a top plan view of the screw-in geothermal heat exchanger of FIG. 1;

FIG. 4 is a partial enlarged elevation view, orthogonal to FIG. 2, of the screw-in geothermal heat exchanger of FIG. 1;

FIG. 5 is an enlarged portion of FIG. 4, as called out at FIG. 4, with an internal passage of the screw-in geothermal heat exchanger shown;

FIG. 6 is a perspective view of another screw-in geothermal heat exchanger according to the principles of the present disclosure;

FIG. 7 is an enlarged portion of FIG. 6, as called out at FIG. 6;

FIG. 8 is an elevation view of the screw-in geothermal heat exchanger of FIG. 6;

FIG. 9 is a top plan view of the screw-in geothermal heat exchanger of FIG. 6;

FIG. 10 is a partial enlarged elevation view, orthogonal to FIG. 8, of the screw-in geothermal heat exchanger of FIG. 6;

FIG. 15 is a perspective view of yet another screw-in geothermal heat exchanger according to the principles of the present disclosure;

FIG. 16 is an elevation view of the screw-in geothermal heat exchanger of FIG. 15;

FIG. 17 is a top plan view of the screw-in geothermal heat exchanger of FIG. 15;

FIG. 18 is a partial enlarged elevation view, orthogonal to FIG. 16, of the screw-in geothermal heat exchanger of FIG. 15;

FIG. 19 is a perspective view of still another screw-in geothermal heat exchanger according to the principles of the present disclosure;

FIG. 20 is an elevation view of the screw-in geothermal heat exchanger of FIG. 19;

FIG. 21 is a top plan view of the screw-in geothermal heat exchanger of FIG. 19;

FIG. 22 is a partial enlarged elevation view, orthogonal to FIG. 20, of the screw-in geothermal heat exchanger of FIG. 19;

FIG. 23 is a perspective view of yet another screw-in geothermal heat exchanger according to the principles of the present disclosure;

FIG. 24 is an elevation view of the screw-in geothermal heat exchanger of FIG. 23;

FIG. 25 is a bottom plan view of the screw-in geothermal heat exchanger of FIG. 23;

FIG. 26 is a partial enlarged elevation view, orthogonal to FIG. 24, of the screw-in geothermal heat exchanger of FIG. 23;

FIG. 27 is a perspective view of still another screw-in geothermal heat exchanger according to the principles of the present disclosure;

FIG. 28 is an elevation view of the screw-in geothermal heat exchanger of FIG. 27;

FIG. 29 is a top plan view of the screw-in geothermal heat exchanger of FIG. 27;

FIG. 30 is a partial enlarged elevation view, orthogonal to FIG. 28, of the screw-in geothermal heat exchanger of FIG. 27;

FIG. 31 is a perspective view of a tool adapted to insert a screw-in geothermal heat exchanger, for example the screw-in geothermal heat exchanger of FIG. 11, according to the principles of the present disclosure;

FIG. 32 is an elevation view of the tool of FIG. 31;

FIG. 33 is a top plan view of the tool of FIG. 31;

FIG. 34 is a partial enlarged elevation view, orthogonal to FIG. 32, of the tool of FIG. 31;

FIG. 37 is a perspective view of yet another screw-in geothermal heat exchanger according to the principles of the present disclosure;

FIG. 38 is an elevation view of the screw-in geothermal heat exchanger of FIG. 37;

FIG. 39 is a bottom plan view of the screw-in geothermal heat exchanger of FIG. 37;

FIG. 40 is a partial enlarged elevation view, orthogonal to FIG. 38, of the screw-in geothermal heat exchanger of FIG. 37;

FIG. 41 is a perspective view of another tool adapted to insert a screw-in geothermal heat exchanger, for example the screw-in geothermal heat exchanger of FIG. 6, according to the principles of the present disclosure;

FIG. 42 is an enlarged portion of FIG. 41, as called out at FIG. 41;

FIG. 43 is an elevation view of the tool of FIG. 41;

FIG. 44 is a top plan view of the tool of FIG. 41;

FIG. 45 is a partial cross-sectional view of the tool of FIG. 41, as called out at FIG. 44;

FIG. 46 is a partial auxiliary view of the tool of FIG. 41, as called out at FIG. 44;

FIG. 47 is a partial enlarged elevation view, orthogonal to FIG. 43, of the tool of FIG. 41;

FIG. 48 is an enlarged portion of FIG. 47, as called out at FIG. 47;

FIG. 49 is a partial elevation view of still another tool adapted to insert a screw-in geothermal heat exchanger, for example the screw-in geothermal heat exchanger of FIG. 23, according to the principles of the present disclosure;

FIG. 50 is a partial cross-sectional view of the tool of FIG. 49, as called out at FIG. 49;

FIG. 54 is a perspective view of the tool of FIG. 51, further illustrating slots;

FIG. 55 is an enlarged portion of FIG. 54, as called out at FIG. 54;

FIG. 56 is a perspective view of a cover adapted to protect a screw-in geothermal heat exchanger, for example the screw-in geothermal heat exchanger of FIG. 6 when positioned on the tool of FIG. 41, according to the principles of the present disclosure;

FIG. 57 is a top plan view of the cover of FIG. 56;

FIG. 58 is an elevation view of the cover of FIG. 56 with a partial cross-section, as called out at FIG. 57;

FIG. 59 is an enlarged portion of FIG. 58, as called out at FIG. 58;

FIG. 60 is a partial enlarged elevation view, orthogonal to FIG. 58, of the cover of FIG. 56;

FIG. 68 is the partial enlarged elevation view of FIG. 64, but further including an inner tube within the cover of FIG. 61;

FIG. 69 is a partial cross-sectional plan view of the cover of FIG. 61 with the inner tube of FIG. 68, as called out at FIG. 68;

FIG. 70 is the elevation view of FIG. 62 with the partial cross-section, as called out at FIG. 68, but further including the inner tube of FIG. 68 within the cover of FIG. 61;

FIG. 71 is an enlarged portion of FIG. 70, as called out at FIG. 70;

FIG. 72 is a perspective view of still another cover adapted to protect a screw-in geothermal heat exchanger, for example the screw-in geothermal heat exchanger of FIG. 23 when positioned on the tool of FIG. 51, according to the principles of the present disclosure;

FIG. 73 is an enlarged portion of FIG. 72, as called out at FIG. 72;

FIG. 74 is an enlarged portion of FIG. 72, as called out at FIG. 72;

FIG. 75 is a perspective view of a tool assembly of the tool of FIG. 41 and the cover of FIG. 61 adapted to protectively insert a screw-in geothermal heat exchanger, for example the screw-in geothermal heat exchanger of FIG. 6, according to the principles of the present disclosure, the tool assembly illustrated in an open configuration;

FIG. 76 is the perspective view of FIG. 75, but with the tool assembly illustrated in a closed configuration;

FIG. 77 is a top plan view of the tool assembly of FIG. 75 with the tool assembly illustrated in the open configuration of FIG. 75;

FIG. 78 is a top plan view of the tool assembly of FIG. 75 with the tool assembly illustrated in the closed configuration of FIG. 76;

FIG. 79 is an elevation view of another tool assembly of the tool of FIG. 51 and the cover of FIG. 72 adapted to protectively insert a screw-in geothermal heat exchanger, for example the screw-in geothermal heat exchanger of FIG. 23, according to the principles of the present disclosure, the tool assembly illustrated in a closed configuration with the screw-in geothermal heat exchanger of FIG. 23 installed;

FIG. 80 is an enlarged portion of FIG. 79, as called out at FIG. 79;

FIG. 81 is the elevation view of FIG. 79, but with the tool assembly illustrated in an open configuration with the screw-in geothermal heat exchanger of FIG. 23 installed;

FIG. 82 is an enlarged portion of FIG. 81, as called out at FIG. 81;

FIG. 83 is a partial perspective view of the tool assembly of FIG. 79 with the tool assembly illustrated in the closed configuration of FIG. 79 with the screw-in geothermal heat exchanger of FIG. 23 installed;

FIG. 84 is the partial perspective view of FIG. 83, but with the tool assembly of FIG. 79 illustrated in the open configuration of FIG. 81 with the screw-in geothermal heat exchanger of FIG. 23 installed;

FIG. 85 is a perspective view of still another screw-in geothermal heat exchanger and tool assembly according to the principles of the present disclosure;

FIG. 86 is a top plan view of the screw-in geothermal heat exchanger and tool assembly of FIG. 85;

FIG. 87 is an elevation view of the screw-in geothermal heat exchanger and tool assembly of FIG. 85;

FIG. 88 is a partial enlarged cross-sectional view of the screw-in geothermal heat exchanger and tool assembly of FIG. 85, as called out at FIG. 87;

FIG. 89 is a partial cross-sectional view normal to a helical tube support of a tool adapted to insert a screw-in geothermal heat exchanger, for example the tool of FIG. 49, according to the principles of the present disclosure, the helical tube support including an injection passage;

FIG. 90 is a partial cross-sectional view normal to a helical tube support of a tool adapted to insert a screw-in geothermal heat exchanger, for example the tool of FIG. 49, according to the principles of the present disclosure, the helical tube support covered by a snap-on helical cover in an installed configuration;

FIG. 91 is the partial cross-sectional view of FIG. 90, but with the snap-on helical cover in a snapped-off configuration;

FIG. 92 is a schematic elevation view of a screw-in geothermal heat exchanger, a tool assembly, and an installation apparatus according to the principles of the present disclosure;

FIG. 93 is a flowchart illustrating a method of operating the installation apparatus of FIG. 92 according to the principles of the present disclosure;

FIG. 94 is a schematic perspective view of a tube of a screw-in geothermal heat exchanger according to the principles of the present disclosure, the tube illustrated with one-way barbs in a sliding configuration;

FIG. 95 is the schematic perspective view of FIG. 94, but with the one-way barbs in a gripping configuration;

FIG. 96 is a schematic plan view of a return fitting of a screw-in geothermal heat exchanger, for example the screw-in geothermal heat exchanger of FIG. 85, according to the principles of the present disclosure, the return fitting illustrated with one-way barbs in a sliding configuration; and FIG. 97 is the schematic plan view of FIG. 96, but with the one-way barbs illustrated in a gripping configuration.

DETAILED DESCRIPTION

Figure 13:
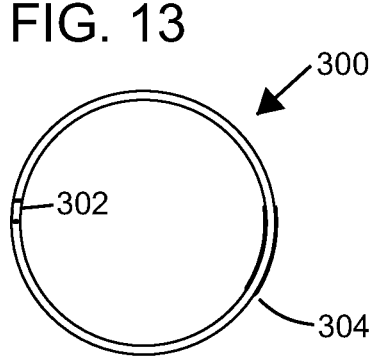
FIG. 13 is a top plan view of the screw-in geothermal heat exchanger of FIG. 11.
Figure 11:
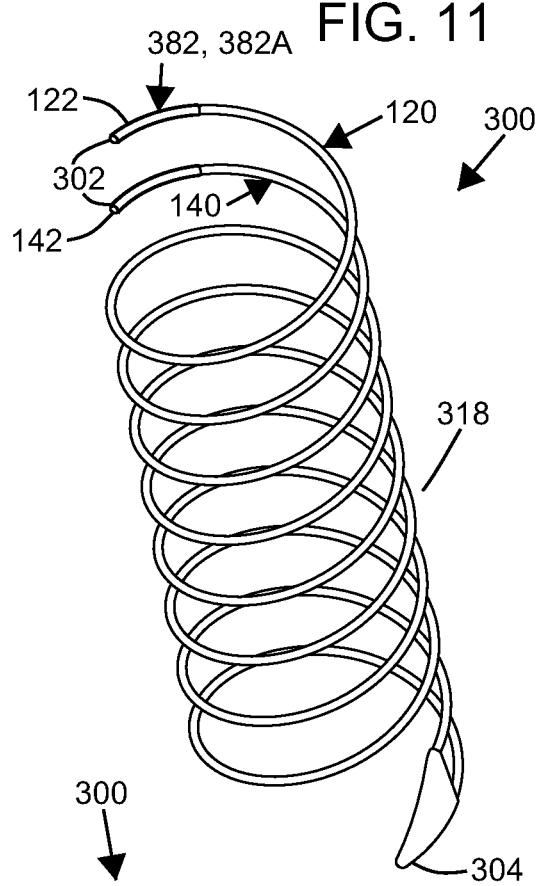
FIG. 11 is a perspective view of still another screw-in geothermal heat exchanger according to the principles of the present disclosure.
Figure 12:
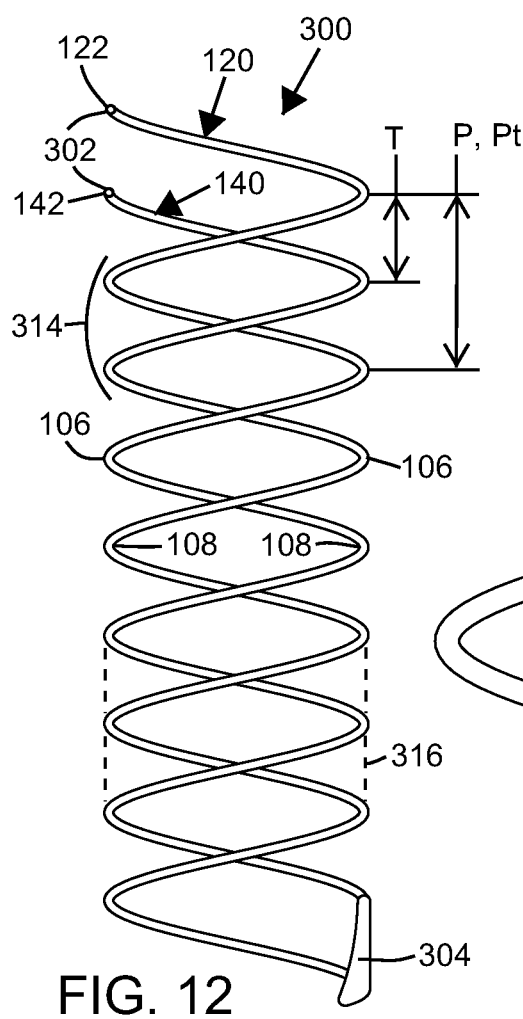
FIG. 12 is an elevation view of the screw-in geothermal heat exchanger of FIG. 11.

According to the principals of the present disclosure, a screw-in geothermal heat exchanger system and methods of installing the screw-in geothermal heat exchanger systems are illustrated and described. The screw-in geothermal heat exchangers may be connected to a geothermal heat pump and thereby exchange energy between soil in which the screw-in geothermal heat exchanger is installed in a building in which climate control provided by the geothermal heat pump is desired. The screw-in geothermal heat exchangers typically include a tube that is screwed in to the earth with a tool. In certain embodiments, the tool is removed thereby leaving the screw-in geothermal heat exchanger in the soil and allowing the tool to be reused in installing additional screw-in geothermal heat exchangers. In particular, the tube typically includes a first portion where flow continues further into the soil upon reaching an end of the first portion, the flow is returned through a second portion where the flow is directed toward exiting the soil. In certain embodiments, a first tube may be used for the first portion and at an end of the first tube a return fitting may be connected between the end of the first tube and a beginning of a second tube. In certain embodiments, the return fitting is factory applied to the ends of the first and second tubes (i.e., the end of the first tube and the beginning of the second tube) thereby providing a robust connection between the first and the second tubes. In use, a heat-exchanging fluid is pumped into the first tube and subsequently out of the second tube. A first temperature (i.e., an inlet temperature) of the fluid going into the first tube is different than a second temperature (i.e., an outlet temperature) of the fluid when it comes out of the second tube. If the outlet temperature of the fluid coming out of the second tube is higher than the inlet temperature of the fluid going into the first tube, then heat energy has been delivered to the fluid from the soil. This heat energy may be used to heat an interior of the building, used to heat water, etc. Likewise, if the outlet temperature of the fluid exiting the outlet of the second tube is lower than the inlet temperature of the fluid entering the inlet of the first tube, heat has been transferred from the fluid to the soil. The heat being transferred to the soil may be heat rejected from the building by the heat pump. Rejecting this heat into the soil may thereby cool the building.

A plurality of the screw-in geothermal heat exchangers may be used together and fluidly connected to the same geothermal heat pump. Such installations typically have a supply manifold that delivers fluid to a plurality of inlets and further includes a return manifold that gathers flow coming from a plurality of outlets of the plurality of screw-in geothermal heat exchangers. In certain embodiments, the fluid may be a refrigerant and be processed through a thermodynamic cycle directly. In particular, the fluid may condense within the screw-in geothermal heat exchanger and thereby release heat to the soil. The fluid may alternatively evaporate and thereby absorb heat from the soil through the geothermal heat exchanger. In other embodiments, a liquid may be pumped through the screw-in geothermal heat exchanger and a secondary heat exchanger may transfer heat energy to and from the fluid of the screw-in geothermal heat exchanger to a refrigerant and thereby heat or cool the refrigerant.

In certain installations, the collection manifolds and the supply manifolds may be buried. The buried manifolds may exit the soil at a single location. In other embodiments, the ends of the first tube and the second tube may directly exit the soil. The same tubing that is used in the first tube and the second tube may thereby be routed directly to the heat pump.

Turning now to FIGS. 1-5, a heat exchanger loop 100 according to the principles of the present disclosure is illustrated. The heat exchanger loop 100 includes a first end 102 and a second end 104. As depicted, the heat exchanger loop 100 includes a first tube 120 and a second tube 140. The first tube extends between a first end 122 and a second end 124. Likewise the second tube 140 extends between a first end 142 and a second end 144. As depicted, a return fitting 160 is included between the first tube 120 and the second tube 140 at the second end 104 of the heat exchanger 100. In particular a first port 162 of the return fitting 160 is connected to the first tube 120 and a second port 164 of the return fitting 160 is connected to the second tube 140. A passage 168 connects the first port 162 to the second port 164. A center divide 166 (i.e., a divide) may be positioned between the first port 162 and the second port 164. A tip 172 may be included on the return fitting 160. A flange 170 may be included opposite the tip 172 on the return fitting 160. The first port 162 and the second port 164 may be included on the flange 170. The tip 172 may be used to penetrate soil 2000 (see FIG. 92) when installing the heat exchanger loop 100 into the soil 2000.

As depicted, the heat exchanger loop 100 is routed along a helical path 118 including multiple coils 114. Together, the multiple coils 114 and the helical path 118 define a revolved shape 116. As depicted, the revolved shape 116 is in a form of a cone with a vertex V. The helical path 118 may define a pitch P. In particular, the pitch P may be a pitch Pt of the tubes 120, 140. Each of the tubes 120, 140 includes an interior 126 and 146, respectively. Likewise, each of the tubes 120, 140 includes an exterior 128 and 148, respectively. The tubes 120, 140 together define an outer surface portion 106 and an inner surface portion 108. The tubes 120, 140 together define an upper surface portion 110 and a lower surface portion 112. As illustrated, the second end 104 of the heat exchanger loop 100 stops short of the vertex V. In other embodiments, the second end 104 may extend to the vertex V.

Turning now to FIGS. 6-10 another heat exchanger loop 200 according to the principles of the present disclosure is illustrated. The heat exchanger loop 200 has similarities to the heat exchanger loop 100. The similar features will typically not be redundantly described. The heat exchanger loop 200 extends from a first end 202 to a second end 204. A helical path 218 followed by the heat exchanger loop 200 is different from the path 118 followed by the heat exchanger loop 100. In particular, a helix angle α is smaller for the heat exchanger loop 200 when compared with the heat exchanger loop 100. Thus, a revolved shape 216 of coils 214 of the heat exchanger loop 200 is conical, but with a smaller helix angle α compared with the cone of the revolved shape 116.

A return fitting 260 of the heat exchanger loop 200 may include additional features compared with the return fitting 160. The return fitting 260 could also be used on the heat exchanger loop 100. The return fitting 260 includes a flange 270. The flange 270 includes a releasable attachment feature 272. As depicted, the releasable attachment feature 272 is a pinhole. The releasable attachment feature 272 and the flange 270 may be driven into the soil 2000 (see FIG. 92) by a tool as will be further described hereinafter. Upon reaching a desired depth Dh in the soil 2000, the tool may be reversed (e.g., rotationally reversed) and thereby disengage from the releasable attachment feature 272 and the flange 270. The return fitting 260 may thereby be left in the soil 2000 after serving as a soil penetrating device. In particular, the return fitting 260 may include the tip 172 (see FIG. 5). The tip 172 may define a tip angle β (see FIGS. 5 and 10). The tip 172 may effectively be driven into the soil 2000 by the tool and thereby pierce the soil 2000.

Turning now to FIGS. 11-14, a heat exchanger loop 300 according to the principles of the present disclosure is illustrated. The heat exchanger loop 300 includes features similar to the heat exchanger loops 100 and 200. The similar features typically will not be redundantly described. The heat exchanger loop 300 extends from a first end 302 to a second end 304. As depicted, a helical path 318 of coils 314 of the heat exchanger loop 300 defines a revolved shape 316 in a shape of a cylinder. In other embodiments, the revolved shape 316 may include other shapes (e.g., a cone). Likewise, the revolved shapes 116, 216 may include the form of a cylinder. A return fitting 360 of the heat exchanger loop 300 includes the first port 162 and the second port 164. However, the first port 162 is spaced farther from the second port 164 than a spacing depicted on the heat exchanger loops 100 and 200. A center divide 366 (i.e., a divide) of the heat exchanger loop 300 is therefore larger than the center divide 166 of the heat exchanger loops 100 and 200. Correspondingly, a flange 370 is also larger than the flange 170 and the flange 270, at least in a dimension that extends between the first port 162 and the second port 164. The flange 370 may be positioned, at least partially, between the first port 162 and the second port 164. The flange 370 may include the releasable attachment feature 272 in certain embodiments.

As depicted, a connecting structure 380 is illustrated at the first port 162 and the second port 164. The connecting structure 380 may take a form of an inside tube or an outside tube and may be part of the return fitting 360. The connecting structure 380 may reinforce the connections at the first port 162 and the second port 164. A similar connecting structure may be used on the heat exchanger loops 100 and/or 200. A tip 372 of the heat exchanger loop 300 is depicted larger than the tip 172. As depicted, the first port 162 and the second port 164 are spaced such that the first tube 120 and the second tube 140 are spaced from each other at a half pitch T. The first tube 120 and the second tube 140 therefore follow a combined double helix path.

Figure 14:
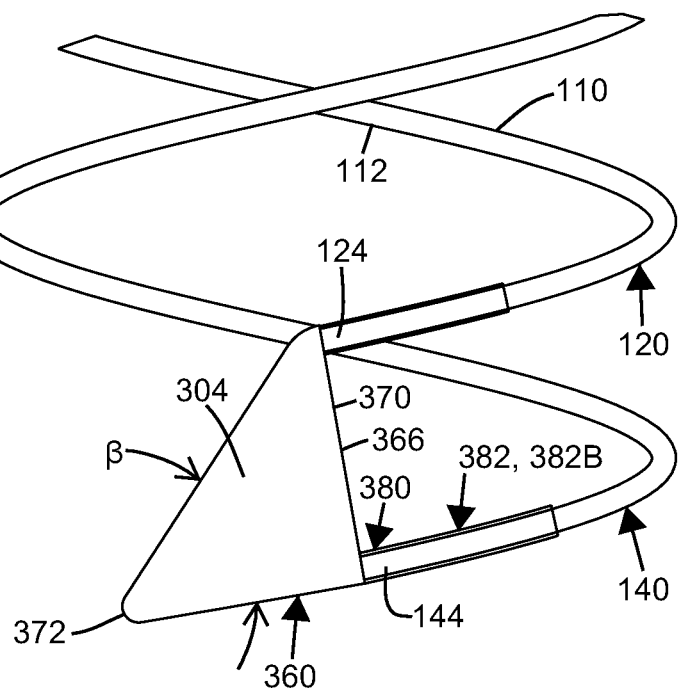
FIG. 14 is a partial enlarged elevation view, orthogonal to FIG. 12, of the screw-in geothermal heat exchanger of FIG. 11.

As depicted at FIG. 14, a seal 382 may be defined at/or near the second end 304 of the heat exchanger loop 300. A seal 382 may also be included at the first end 302 of the heat exchanger loop 300. In particular, a seal 382A may be included on the first end 122 of the first tube 120 and also on the first end 142 of the second tube 140. Likewise, a seal 382B may be included on the second end 124 of the first tube 120 and also on the second end 144 of the second tube 140. The seals 382, 382A, 382B may likewise be included on the heat exchanger loops 100 and/or 200. The seals 382, 382A, 382B may be used to seal against a tool with a pressurized tube as will be described hereinafter. The pressurized tube of the tool may eject the heat exchanger loop 300 from the tool by pressurizing the pressurized tube of the tool with an ejection pressure. By controlling the ejection pressure and a rotational position and an axial position of the tool, the heat exchanger loop 300 may be left in the soil 2000 (see FIG. 92) and the tool may be extracted from the soil 2000 without damaging the heat exchanger loop 300.

Turning now to FIGS. 15-18, a heat exchanger loop 400 according to the principles of the present disclosure is illustrated. The heat exchanger loop 400 is similar to the heat exchanger loop 300, but includes a web 484 between the first tube 120 and the second tube 140. The heat exchanger loop 400 extends between a first end 402 and a second end 404. An outer surface portion 406 may be defined by the web 484 in combination with the first tube 120 and the second tube 140. Likewise, an inner surface portion 408 may be defined by the web 484, the first tube 120, and the second tube 140. An upper surface portion 410 may be defined by the first tube 120. Likewise, a lower surface portion 412 may be defined by the second tube 140. The first tube 120, the second tube 140, and the web 484 follow a helical path 418 along a plurality of coils 414. As depicted, the helical path 418 defines a revolved shape 416 in a form of a cylinder. In other embodiments, other revolved shapes may be defined by the helical path 418. A return fitting 460 of the heat exchanger loop 400 is similar to the return fitting 360, but includes a tip 472 that is substantially centered between the first tube 120 and the second tube 140. A center divide 466 is similar to the center divide 366 but may connect with the web 484. The web 484 may function as an installation aid and/or may function as a heat-exchanging fin adapted to exchange heat energy between the first tube 120 and/or the second tube 140 and the soil 2000 (see FIG. 92). A flange 470 may be similar to the flange 370, but may connect with the web 484. The flange 470 may be substantially thicker than the web 484.

Turning now to FIGS. 19-22, another heat exchanger loop 400' is illustrated according to the principles of the present disclosure. The heat exchanger loop 400' is similar to the heat exchanger loop 400 but further includes an additional web 486. The heat exchanger loop 400' may form an enclosed revolved shape 416' (e.g., a cylinder or a portion of a cone). The heat exchanger loop 400' may extend between a top 416T' and a bottom 416B'. The revolved shape 416' may take a form of a cylinder with an opening at the top 416T' and at the bottom 416B'. A return fitting 460' of the heat exchanger loop 400' may include a tip 472' that is projected from the second tube 140.

Turning now to FIGS. 23-26, a heat exchanger loop 500 according to the principles of the present disclosure is illustrated. The heat exchanger loop 500 extends between a first end 502 and a second end 504. The first tube 120 and the second tube 140 follow a helical path 518 similar to the helical path 318, described above (i.e., a double helix). As depicted, the helical path 518 of the multiple coils 314 defines a revolved shape 516 of a cylinder. In other embodiments, the revolved shape 516 may include a form of a portion of a cone. The heat exchanger loop 500 includes a return fitting 560 with a first side 562 and a second side 564. Like the return fitting 160, the return fitting 560 includes a passage 168 with a first port 162 and a second port 164. The first port 162 similarly connects to the first tube 120, and the second port 164 similarly connects to the second tube 140. As depicted, a center divide 566 (i.e., a divide) of the return fitting 560 substantially extends across the revolved shape 516 at the second end 504 of the heat exchanger loop 500. A centering tip 574 may be included on the return fitting 560. The return fitting 560 further includes a flange 570. The flange 570 may include a releasable attachment feature similar to or the same as the releasable attachment feature 272, described above. The return fitting 560 includes a pair of tips 572 that may cut and penetrate the soil 2000 (see FIG. 92). The return fitting 560 may be left in the soil 2000 upon the retraction of the tool. Other aspects of the heat exchanger loop 500 may be similar to or the same as the heat exchanger loops 400', 400, 300, 200, and/or 100.

Turning now to FIGS. 27-30, a screw-in pile 600 is illustrated according to the principles of the present disclosure. The screw-in pile 600 includes a heat exchanger loop 300' similar to the heat exchanger loop 300, described above. The screw-in pile 600 may be used to both exchange heat energy between a fluid and the soil 2000 (see FIG. 92) and further be used as a screw-in pile. The screw-in pile 600 extends between a first end 602 and a second end 604. The screw-in pile 600 includes a drive tube 610 with a first end 612 and a second end 614. As depicted, the drive tube 610 may terminate at a centering member 620. The centering member 620 may extend between a first end 622 and a second end 624. The first end 622 of the centering member 620 may coincide with and/or be connected with the second end 614 of the drive tube 610. The screw-in pile 600 may include a first flighting 630 and a second flighting 640. The first and the second flighting 630, 640 may take a shape generally like an auger.

However, a function of the flighting 630, 640 is to screw into the soil 2000 (see FIG. 92) and not necessarily remove soil by auguring. Upon screwing in the screw-in pile 600, the drive tube 610 may displace a given amount of the soil and thereby require auguring of a volume of soil sufficient to compensate for a volume of the drive tube 610. In other embodiments, the centering member 620 is discarded and soil may fill a center of the drive tube 610. By filling the center of the drive tube 610, auguring out compensating soil may be reduced or even eliminated. In still other embodiments, the centering member 620 may compress the soil 2000 and thereby reduce or eliminate auguring out compensating soil.

The first flighting 630 and the second flighting 640 may take a form of a helicoid. The first flighting 630 extends between a first end 632 and a second end 634. The first flighting 630 extends between an outer edge 636 and an inner edge 638. The outer edge 636 may be connected to the first tube 120. The inner edge 638 of the flighting 630 may be connected to the drive tube 610. Likewise, the second flighting 640 extends between a first end 642 and a second end 644. The second flighting 640 may extend between an outer edge 646 and an inner edge 648. The outer edge 636 may attach to the second tube 140. The inner edge 648 may connect with the drive tube 610.

Turning now to FIGS. 37-40, another screw-in pile 700 according to the principles of the present disclosure is illustrated. The screw-in pile 700 includes a heat exchanger loop 500' similar to the heat exchanger loop 500, described above. The screw-in pile 700 further includes similarities with the screw-in pile 600 that will not typically be redundantly described. The screw-in pile 700 extends between a first end 702 and a second end 704. The screw-in pile 700 includes a drive tube 710 that extends between a first end 712 and a second end 714. The screw-in pile 700 includes a centering member 720 that extends between a first end 722 and a second end 724. The first end 722 of the centering member 720 may be connected with and/or adjacent to the second end 714 of the drive tube 710. The screw-in pile 700 includes a first flighting 730 and a second flighting 740. As described above, with respect to the flightings 630 and 640, the flightings 730 and 740 do not necessarily need to auger material (e.g., soil). Similarly, the centering member 720 may be removed and the drive tube 710 allowed to fill with soil. The first flighting member 730 extends between a first end 732 and a second end 734. The first flighting 730 extends between an outer edge 736 and an inner edge 738. The outer edge 736 may connect with the first tube 120. The inner edge 738 may connect with the drive tube 710. The second flighting 740 extends between a first end 742 and a second end 744. The second flighting 740 extends between an outer edge 746 and an inner edge 748. The outer edge 746 may connect with the second tube 140. The inner edge 748 may connect with the drive tube 710.

Turning now to FIGS. 31-36, an insertion tool 1000 is illustrated according to the principles of the present disclosure. The insertion tool 1000 is adapted to screw the heat exchanger loop 300 into soil 2000 (see FIG. 92) and, after having screwed the heat exchanger loop 300 to a desired depth Dh in the soil 2000, to eject the heat exchanger loop 300 from the insertion tool 1000 by applying ejection pressure within a first tube 1020 and a second tube 1040 of the insertion tool 1000. As the ejection pressure is applied to the first tube 1020 and the second tube 1040, the insertion tool 1000 is unscrewed from the soil 2000 and thereby leaves the heat exchanger loop 300 behind in the soil 2000. The first tube 1020 and the second tube 1040 may be pressurized with water or may be pressurized with grout and thereby leave the first tube 120 and the second tube 140 of the heat exchanger loop 300 surrounded by the grout after installation is complete. FIG. 92 schematically illustrates methods of coordinating the withdrawal of the insertion tool 1000 from the soil 2000 without damaging the heat exchanger loop 300. Likewise, the flowchart at FIG. 93 provides a method for withdrawing the insertion tool 1000 from the soil 2000 without damaging the heat exchanger loop 300.

The insertion tool 1000 extends from a first end 1002 to a second end 1004. The insertion tool 1000 defines an outer surface portion 1006, an upper surface portion 1010, and a lower surface portion 1012. The outer surface portion 1006, the upper surface portion 1010, and the lower surface portion 1012, may generally displace soil normal to their orientations as the insertion tool 1000 is screwed into the soil 2000. The first tube 1020 and the second tube 1040 may be made of a suitably hard material such as steel or high strength low alloy steel or high temper steel to resist damage from the soil 2000 while the insertion tool 1000 is screwed in and out of the soil 2000. The first tube 1020 and the second tube 1040 follow a helical path 1018 and may include multiple coils 1014. In following the path 1018, the first tube 1020 and the second tube 1040 generally define a revolved shape 1016. As depicted, the revolved shape is a cylinder. In other embodiments, the revolved shape 1016 may include a conical portion and/or other revolved shape(s).

The first tube 1020 extends from a first end 1022 to a second end 1024. The first tube 1020 includes an interior 1026 generally adapted to hold the first tube 120 of the heat exchanger 300. The first tube 1020 also defines an exterior 1028 generally adapted to displace the soil 2000 and protect the tube 120. Likewise, the second tube 1040 extends from a first end 1042 to a second end 1044. The second tube 1040 includes an interior 1046 adapted to hold the second tube 140 of the heat exchanger loop 300. The second tube 1040 further includes an exterior 1048. The exterior 1048 is adapted to displace the soil 2000 and protect the second tube 140.

Figure 35:
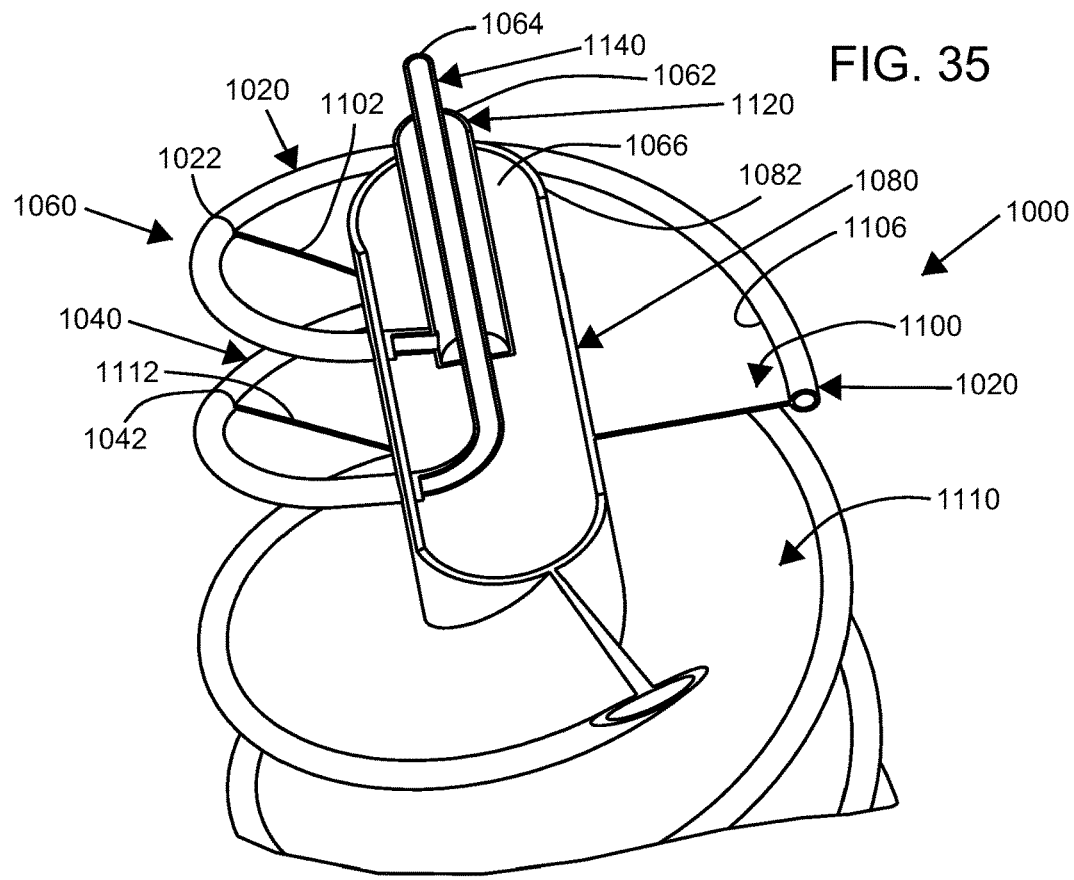
FIG. 35 is an enlarged portion of FIG. 31, but with a cut-away illustrating fluid passages.
Figure 36:
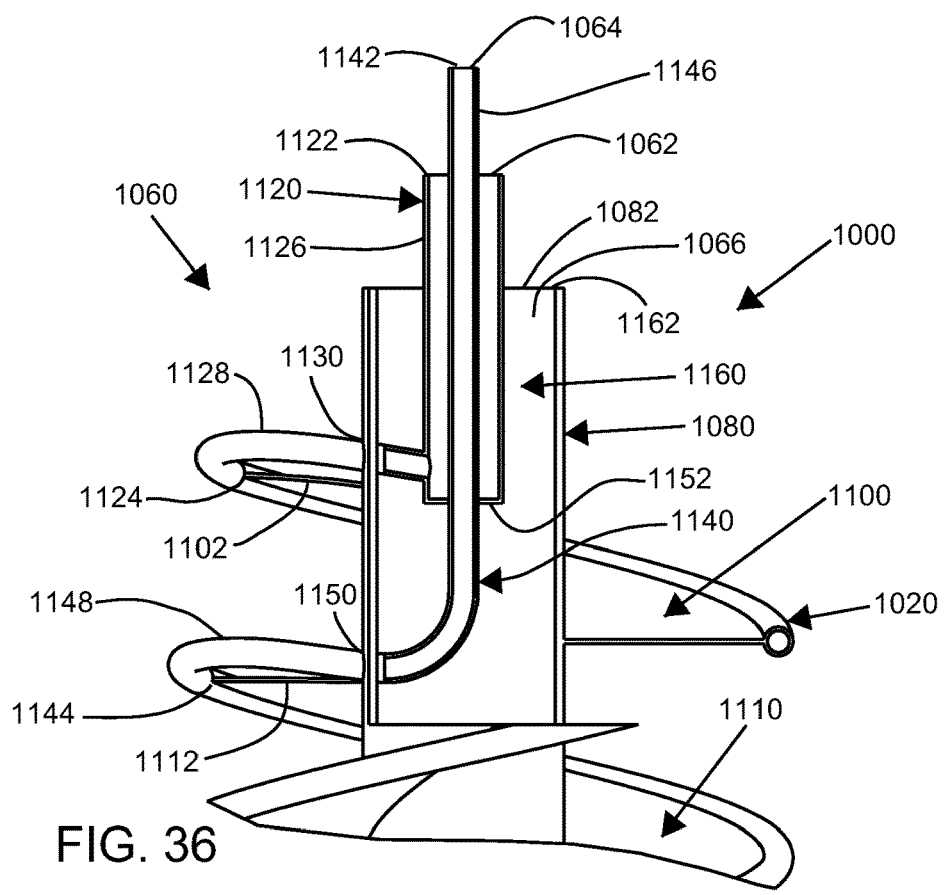
FIG. 36 is a partial enlarged elevation view of the tool of FIG. 31 further illustrating the cut-away of the fluid passages of FIG. 35.
Figure 52:
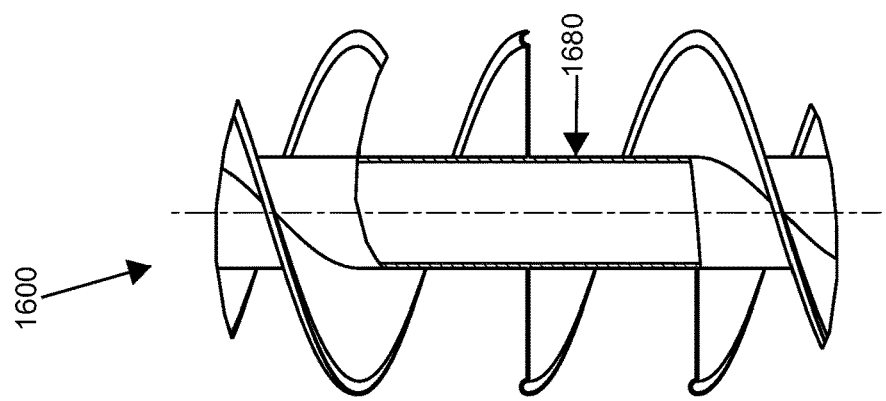
FIG. 52 is a partial cross-sectional view of the tool of FIG. 51, as called out at FIG. 51.
Figure 51:
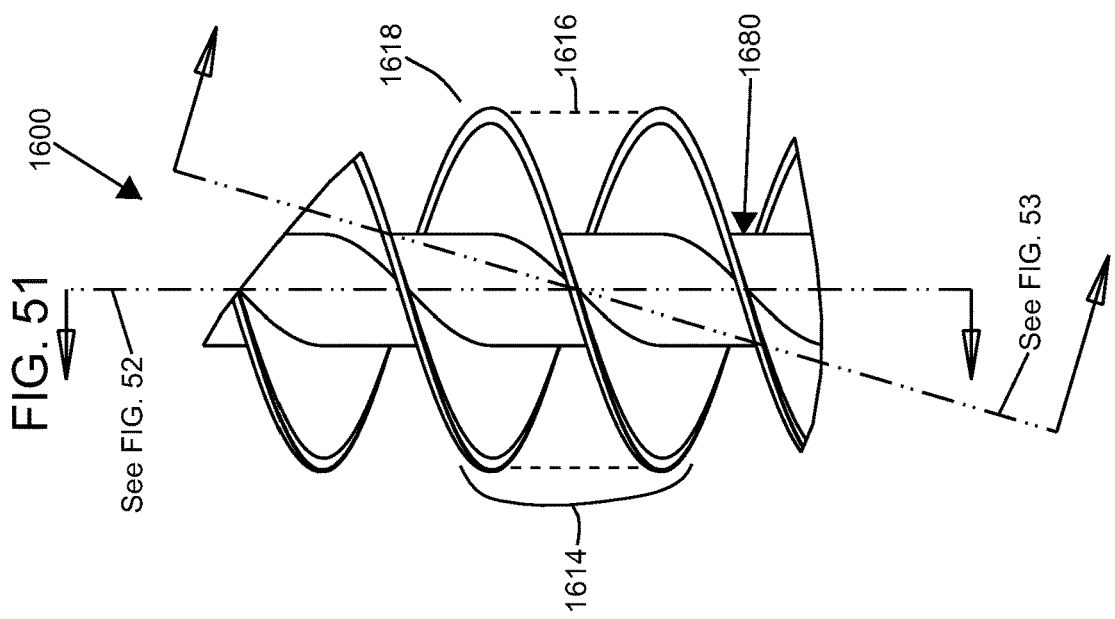
FIG. 51 is a partial elevation view of yet another tool adapted to insert a screw-in geothermal heat exchanger, for example the screw-in geothermal heat exchanger of FIG. 23, according to the principles of the present disclosure.
Figure 53:
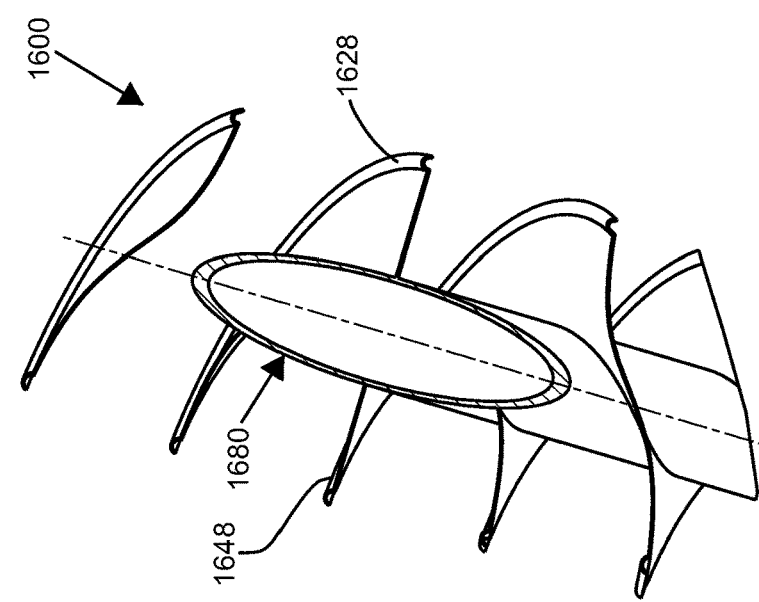
FIG. 53 is a partial cross-sectional view of the tool of FIG. 51, as called out at FIG. 51.
Figure 61:
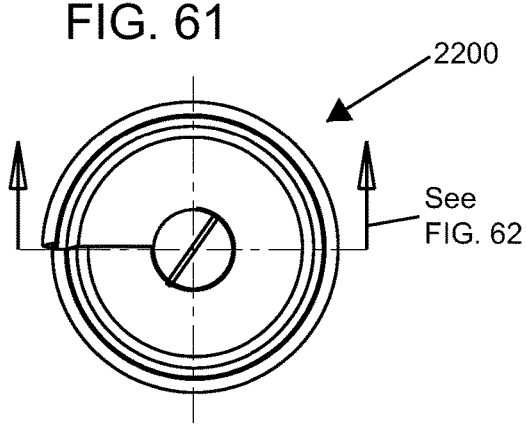
FIG. 61 is a top plan view of another cover adapted to protect a screw-in geothermal heat exchanger, for example the screw-in geothermal heat exchanger of FIG. 6 when positioned on the tool of FIG. 41, according to the principles of the present disclosure.
Figure 62:
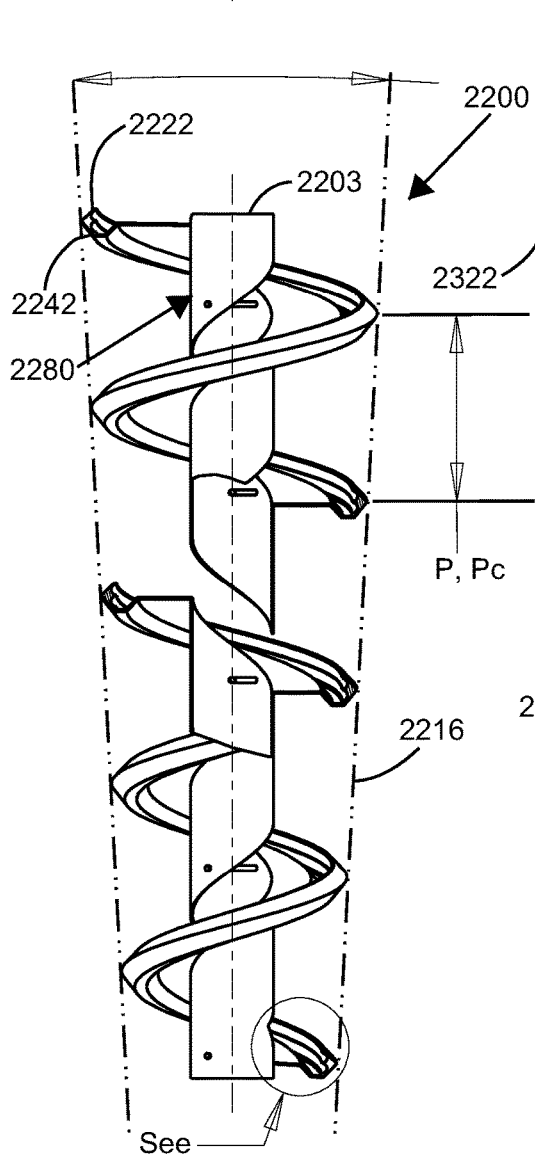
FIG. 62 is an elevation view of the cover of FIG. 61 with a partial cross-section, as called out at FIG. 61.
Figure 64:
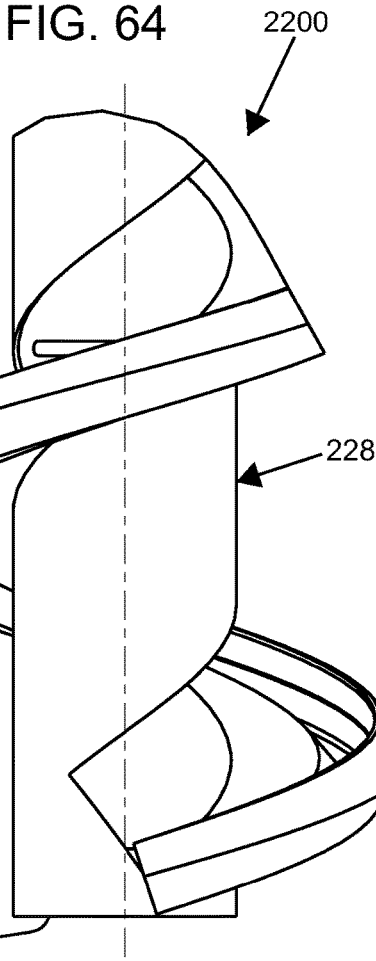
FIG. 64 is a partial enlarged elevation view, orthogonal to FIG. 62, of the cover of FIG. 61.
Figure 63:
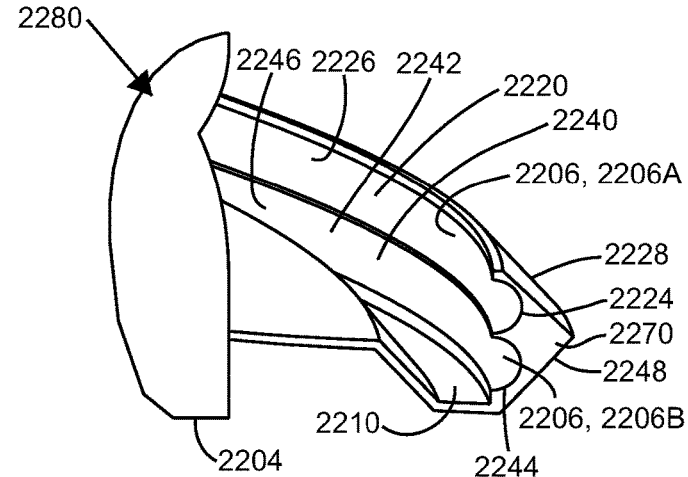
FIG. 63 is an enlarged portion of FIG. 62.
Figure 67:
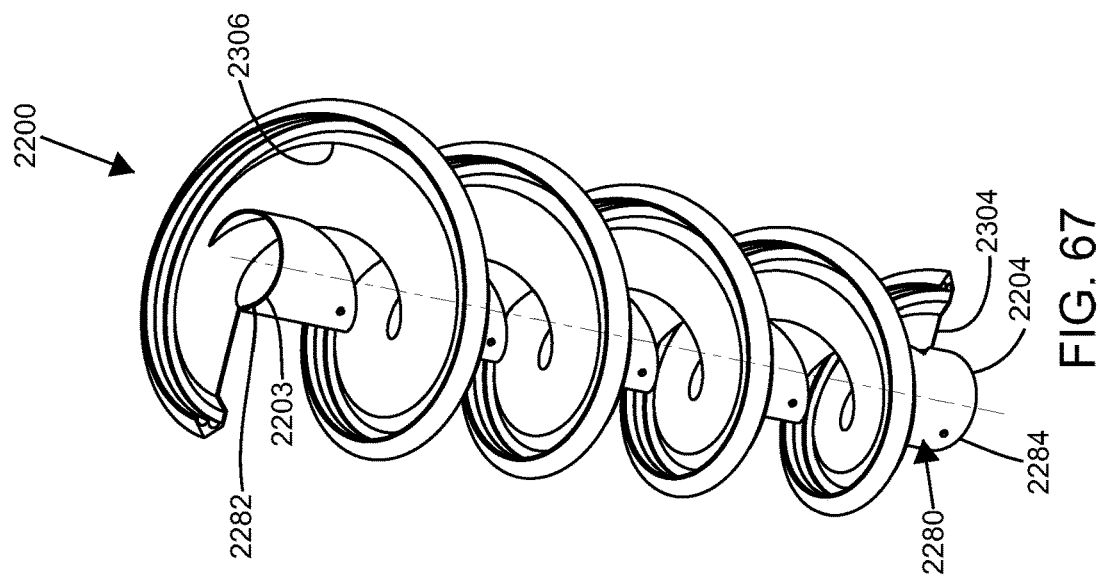
FIG. 67 is still another perspective view of the cover of FIG. 61.
Figure 66:
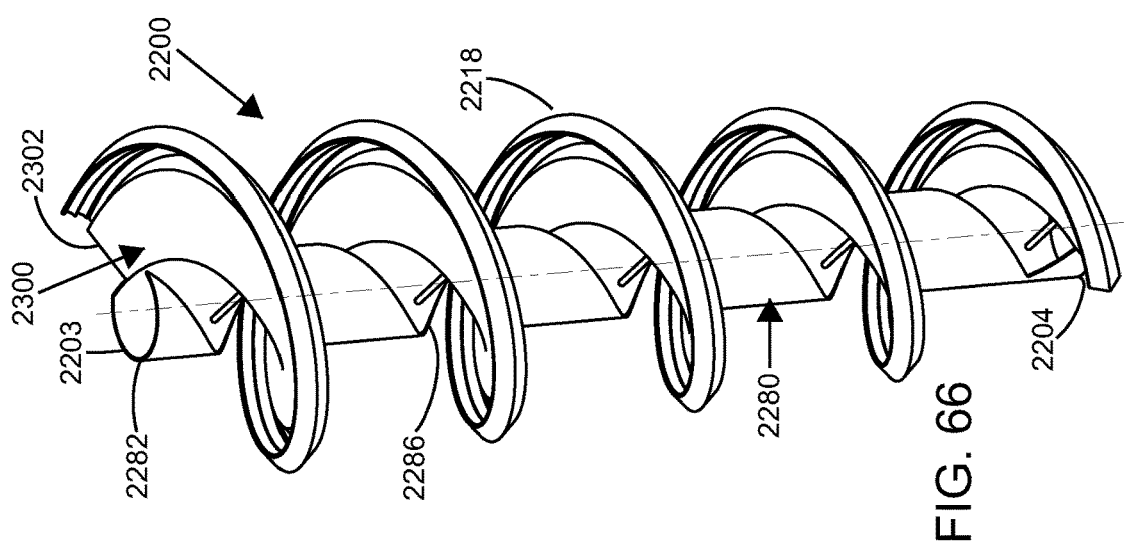
FIG. 66 is another perspective view of the cover of FIG. 61.
Figure 65:
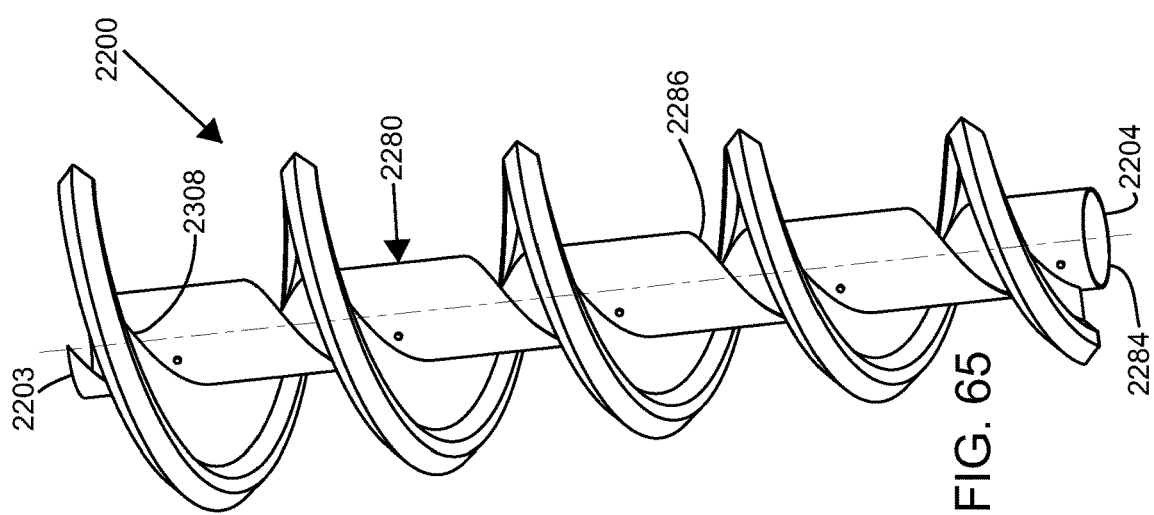
FIG. 65 is a perspective view of the cover of FIG. 61.

As further illustrated at FIGS. 35 and 36, the insertion tool 1000 includes a concentric fitting 1060 adapted to facilitate the pressurization of the first tube 1020 and the second tube 1040 while the insertion tool 1000 is being screwed into and out of the soil 2000. The concentric fitting 1060 includes a first port 1062 and a second port 1064 and a third port 1066. The first port 1062 may be used to pressurize the first tube 1020. Likewise, the second port 1064 may be used to pressurize the second tube 1040. The third port 1066 may be used to pressurize a drive tube 1080 and thereby provide a force that assists the withdrawal of the insertion tool 1000 from the soil 2000. The drive tube 1080, the first tube 1020, and/or the second tube 1040 may thereby be pressurized with water or may be pressurized with grout.

The drive tube 1080 may be used to apply a rotational torque that screws the insertion tool 1000 into and/or out of the soil 2000 (see FIG. 92). The insertion tool 1000 may be screwed into and/or out of the soil 2000 by attaching an actuator 4100 (e.g., a high torque hydraulic motor and/or gearbox) to a first end 1082 of the drive tube 1080. The drive tube 1080 extends between the first end 1082 and a second end 1084. A centering member 1090 may be included at the second end 1084 of the drive tube 1080. In certain embodiments, the centering member 1090 may be attached at a first end 1092 to the second end 1084 of the drive tube 1080. In certain embodiments, pressurizing the drive tube 1080 expels the centering member 1090 from the drive tube 1080 and thereby leaves the centering member 1090 in the soil 2000 as the insertion tool 1000 is withdrawn from the soil 2000. In other embodiments, the centering member 1090 may be omitted. The centering member 1090 extends from the first end 1092 to a second end 1094. The second end 1094 may include a tip that may be used to pierce the soil 2000.

The insertion tool 1000 further includes a first flighting 1100 that extends between a first end 1102 and a second end 1104. The flighting 1100 includes an outer edge 1106 that may be attached to the first tube 1020 and an inner edge 1108 that may be attached to the drive tube 1080. The first flighting 1100 may or may not necessarily be an auger, as discussed above. The first flighting 1100 may take a form of a helicoid. The insertion tool 1000 further includes a second flighting 1110 similar to the first flighting 1100. The second flighting 1110 extends between a first end 1112 and a second end 1114. The second flighting 1110 extends between an outer edge 1116 that may be connected to the second tube 1040. The second flighting 1110 may include an inner edge 1118 that may be attached to the drive tube 1080.

As illustrated at FIG. 35, the insertion tool 1000 may include a passage arrangement 1120. The passage arrangement 1120 may extend between a first end 1122 and a second end 1124. The passage arrangement 1120 may include a central tube 1126 that provides a first concentric fluid connection to the first tube 1020 that is helically coiled about the insertion tool 1000. The passage arrangement 1120 includes a transition tube 1128. The passage arrangement 1120 may further include a wall opening 1130 through the drive tube 1080. The insertion tool 1000 may further include a passage arrangement 1140 similar to the passage arrangement 1120 but adapted to provide a second concentric fluid connection to the second tube 1040. The passage arrangement 1140 extends between a first end 1142 and a second end 1144. The passage arrangement 1140 includes a central tube 1146. The central tube 1146 may be concentric with the drive tube 1080. The passage arrangement 1140 may include a transition tube 1148. The passage arrangement 1140 may include a wall opening 1150 that passes through the drive tube 1080. The passage arrangement 1140 may further include a tube opening 1152 that passes through the central tube 1126 of the passage arrangement 1120. The insertion tool 1000 further includes a passage arrangement 1160 that extends between a first end 1162 and a second end 1164. The passage arrangement 1160 may apply pressure to an interior of the drive tube 1080. Pressure applied to the passage arrangement 1160 may provide an expelling force to the insertion tool 1000 as the insertion tool 1000 is withdrawn from the soil 2000.

Turning now to FIGS. 41-48, an insertion tool 1200 according to the principles of the present disclosure is illustrated. The insertion tool 1200 may be used as a tool to insert a heat exchanger loop such as the heat exchanger loop 200 into the soil 2000 (see FIG. 92). After inserting the heat exchanger loop 200, the insertion tool 1200 may be withdrawn from the soil 2000 and thereby leave the heat exchanger loop 200 in the soil 2000. The insertion tool 1200 may also be a mandrel portion of a tool that includes a cover to protect the tubes 120 and 140 of the heat exchanger loop 200. As illustrated, the insertion tool 1200 is adapted to install a pair of tubes that are positioned side by side (e.g., the tubes 120 and 140 of the heat exchanger loop 200). In other embodiments, the insertion tool 1200 may be adapted to install a pair of tubes that are spaced from each other (e.g., the pairs of tubes 120 and 140 of the heat exchanger loops 300, 400, 400', and/or 500, discussed above).

The insertion tool 1200 extends from a first end 1202 to a second end 1204. The insertion tool 1200 includes an outer surface portion 1206. The outer surface portion 1206 may include a first portion 1206A adapted to hold the first tube 120. The outer surface portion 1206 may further include a second portion 1206B adapted to hold and support the second tube 140. The insertion tool 1200 may further include an upper surface portion 1210 and a lower surface portion 1212. The outer surface portion 1206, the upper surface portion 1210, and the lower surface portion 1212 may be included on a tube guide support 1320. The tube guide support 1320 may follow a helical path 1218. The helical path 1218 may include a plurality of revolutions 1214. The plurality of revolutions of the path 1218 developed a revolved shape 1216. As depicted, the revolved shape 1216 includes a portion of a cone. In other embodiments, the revolved shape 1216 may include cylindrical portions.

The insertion tool 1200 includes a first tube support track 1220 that extends from a first end 1222 to a second end 1224. The first tube support track 1220 may be included on the tube guide support 1320. The first tube support track 1220 may include an interior 1226 and an exterior 1228. The insertion tool 1200 further includes a second tube support track 1240. Similar to the first tube support track 1220. The second tube support track 1240 extends between a first end 1242 and a second end 1244. The second tube support track 1240 may include an interior 1246 and an exterior 1248. The insertion tool 1200 may include a flange 1270, and a releasable attachment feature 1272 may be included on the flange 1270 (see FIG. 48). The releasable attachment feature 1272 may engage the releasable attachment feature 272 of the heat exchanger loop 200, and the flange 1270 may engage the flange 270 of the heat exchanger loop 200. The insertion tool 1200 may thereby screw in the heat exchanger loop 300 into the soil 2000. When the insertion tool 1200 is withdrawn, the releasable attachment feature 1272 disconnects from the releasable attachment feature 272.

The insertion tool 1200 may further include a drive tube 1280. The drive tube 1280 extends from a first end 1282 to a second end 1284. Similar to the centering members 620, 720, 1090, discussed above, the insertion tool 1200 may include a centering member 1290 that extends between a first end 1292 and a second end 1294. The insertion tool 1200 includes a flighting 1300 that extends between a first end 1302 and a second end 1304. The flighting includes an outer edge 1306 that may connect to the tube guide support 1320. The flighting 1300 further includes an inner edge 1308 that may connect to the drive tube 1280.

In embodiments with a cover to protect the tubes 120 and 140, the insertion tool 1200 may include a slot set 1370. The slot set 1370 may include a single pair or a plurality of slot pairs 1372. The slot set 1370 may be used to guide the cover as it engages and disengages with the insertion tool 1200, the first tube 120, and/or the second tube 140. The slot pairs 1372 include a first slot 1380 that extends between a first end 1382 and a second end 1384. The slot pair 1372 further includes a second slot 1390 that extends between a first end 1392 and a second end 1394. As depicted, the slots 1380, 1390 of the slot set 1370 are cut within a wall of the drive tube 1280.

Turning now to FIGS. 49 and 50, an insertion tool 1400 is illustrated according to the principles of the present disclosure. The insertion tool 1400 extends between a first end 1402 and a second end. The insertion tool 1400 includes an outer surface portion 1406, an upper surface portion 1410, and a lower surface portion 1412. As depicted, the insertion tool 1400 includes a tube guide support 1520 that follows a helical path 1418 about a plurality of revolutions 1414. The plurality of revolutions 1414 of the helical path 1418 defines a revolved shape 1416. As depicted, the revolved shape 1416 is a cylindrical shape. In other embodiments, the revolved shape 1416 may include at least a portion of a cone shape. Similar to the previous insertion tools, described above, the insertion tool 1400 may include a first tube support track 1420 that extends between a first end 1422 and a second end. The first tube support track 1420 includes an interior 1426 and an exterior 1428. The insertion tool 1400 may further include a second tube support track 1440 that extends between a first end 1442 and a second end. The second tube support track 1440 includes an interior 1446 and an exterior 1448.

The insertion tool 1400 includes a drive tool 1480 that extends between a first end 1482 and a second end. The insertion tool 1400 includes a first flighting 1500 that extends between a first end 1502 and a second end. The first flighting 1500 extends between an outer edge 1506 and an inner edge 1508. The outer edge 1506 may connect with a first tube guide support 1520A of the tube guide support 1520. The inner edge 1508 may connect with the drive tube 1480. The insertion tool 1400 may further include a second flighting 1510 that extends between a first end 1512 and a second end. The second flighting 1510 may extend between an outer edge 1516 and an inner edge 1518. The outer edge 1516 may connect with a second tube guide support 1520B of the tube guide support 1520. As with the insertion tool 1200, the insertion tool 1400 generally faces in an outward radial direction to support the first tube 120 and the second tube 140.

Turning now to FIGS. 51-55, an insertion tool 1600 according to the principles of the present disclosure is illustrated. The insertion tool 1600 is similar to the insertion tool 1400 but faces in an axial direction rather than a radial direction when supporting the tubes 120 and 140. In other embodiments of the present disclosure, an insertion tool may face in a direction with both a radial and an axial component. Both the radial and the axial component may be generally the same magnitude (e.g., positioned to face at 45 degrees from a central axis of the insertion tool 1600). The insertion tool 1600 may be used alone or may be included as a mandrel portion of a tool that further includes a cover to protect the tubes 120 and 140 as they are installed. The insertion tool 1600 extends between a first end 1602 and a second end 1604. The insertion tool 1600 includes an outer surface portion 1606, an inner surface portion 1608, and a lower surface portion 1612. The surface portions 1606, 1608, 1612 may be included on a tube guide support 1720 and, in particular, may be included on a first tube guide support 1720A and a second tube guide support 1720B, respectively.

The insertion tool 1600 may include a first tube support track 1620 and a second tube support track 1640 that generally follow a helical path 1618. The helical path 1618 may define a revolved shape 1616 as it extends a plurality of revolutions 1614 about the central axis of the insertion tool 1600. As depicted, the revolved shape 1616 is a cylindrical shape. In other embodiments, the revolved shape 1616 may include at least a portion shaped like a portion of a cone. The first tube support track 1620 extends from a first end 1622 to a second end 1624. The first tube support track 1620 includes an interior 1626 and an exterior 1628. The second tube support track 1640 extends between a first end 1642 and a second end 1644. The second tube support track 1640 includes an interior 1646 and an exterior 1648. The insertion tool 1600 further includes a drive tube 1680. The drive tube 1680 extends between a first end 1682 and a second end 1684. The insertion tool 1600 further includes a first flighting 1700 that extends between a first end 1702 and a second end 1704. The first flighting 1700 extends between an outer edge 1706 and an inner edge 1708. The outer edge 1706 may connect with the first tube guide support 1720A, and the inner edge 1708 may connect with the drive tube 1680. The insertion tool 1600 further includes a second flighting 1710 that extends between a first end and a second end 1714. The second flighting may extend between an outer edge 1716 and an inner edge 1718. The outer edge 1716 may connect with the second tube guide support 1720B, and the inner edge 1718 may connect with the drive tube 1680.

In embodiments where the insertion tool 1600 is used as a mandrel portion of a tool that includes a cover, the insertion tool 1600 further includes a slot set 1770 that includes a plurality of slot pairs 1772. The slot set 1770 may be used to engage and disengage the cover with the insertion tool 1600 and with the first tube 120 and the second tube 140. Each of the slot pairs 1772 includes a pair of oppositely positioned slots 1780 that extend between a first end 1782 and a second end 1784. The slots 1780 of the slot set 1770 extend generally tangentially (i.e., circumferentially) around and through the drive tube 1680. In contrast, the slots 1380, 1390 of the slot set 1370 of the insertion tool 1200 generally extend along a helix with substantially the same pitch as the flighting 1300 and the tube guide support 1320.

Turning now to FIGS. 61-71, an insertion mandrel cover 2200 is illustrated according to the principles of the present disclosure. The insertion mandrel cover 2200 is generally suited for use with the insertion tool 1200. The insertion mandrel cover 2200 includes a tube cover shield 2320 generally adapted to protect the tubes 120 and 140. In certain embodiments, the insertion mandrel cover 2200 includes a drive tube 2290 adapted to rotate the insertion mandrel cover 2200. The drive tube 2290 is adapted to fit within the drive tube 1280 of the insertion tool 1200 and connect with other portions of the insertion mandrel cover 2200 through the slot set 1370. With the drive tube 2290 included, the insertion mandrel cover 2200 extends between a first end 2202 and a second end 2204. Without the drive tube 2290, the insertion mandrel cover 2200 extends between a first end 2203 and the second end 2204.

The insertion mandrel cover 2200 includes an inner surface portion 2206. The inner surface portion 2206 may include a first portion 2206A adapted to cover the first tube 120 and may further include a second portion 2206B adapted to cover the second tube 140. The inner surface portion(s) 2206, 2206A, 2206B are part of the tube cover shield 2320. The tube cover shield 2320 may further include an upper surface portion 2210 and define a cutting edge 2322. The cutting edge 2322 may be adapted to cut through the soil 2000. The tube cover shield 2320 may follow a helical path 2218 a plurality of revolutions 2214 and thereby define a revolved shape 2216. As depicted, the revolved shape 2216 is in a form of a cone portion. In other embodiments, the revolved shape 2216 may take a form of a cylinder. The inner surface portion 2206A made define a first tube support and protection track 2220. Likewise, the inner surface portion 2206B may define a second tube support and protection track 2240. The first tube support track 2220 may extend between a first end 2222 and a second end 2224. The first tube support track 2220 may define an interior 2226 and an exterior 2228. Likewise, the second tube support track 2240 extends between a first end 2242 and a second end 2244. The second tube support track may define an interior 2246 and an exterior 2248. The tube cover shield 2320 may define a flange 2270. As illustrated at FIGS. 75 and 76, the flange 2270 may assist in separating the flange 270 of the heat exchanger loop 200 from the insertion tool 1200 when removal of the insertion tool 1200 from the soil 2000 is initiated.

The insertion mandrel cover 2200 further includes an outer spiral 2280. The outer spiral 2280 may be formed from a tube with a spiral cut 2286 (see FIGS. 65 and 66). The spiral cut 2286 may extend between a first end 2282 and a second end 2284. As depicted, the spiral cut 2286 stops short of the second end 2284. The outer spiral 2280 may include a set of holes 2288. The set of holes 2288 may be adapted to receive a cross-pin set 2370 (see FIG. 69). The cross-pin set 2370 may include a plurality of cross-pins 2372 that extend between a first end 2380 and a second end 2390. The insertion mandrel cover 2200 may include flighting 2300 that extends between a first end 2302 and a second end 2304. The flighting 2300 may extend between an outer edge 2306 and an inner edge 2308. The outer edge 2306 may connect with the tube cover shield 2320. The inner edge 2308 may connect with the outer spiral 2280. As depicted, the inner edge 2308 and the outer spiral 2280 connect at an "L" intersection. The drive tube 2290 extends between a first end 2292 and a second end 2294. The drive tube 2290 may include a set of holes 2298. The holes 2298 may be adapted to receive the cross-pin set 2370 (see FIG. 69). The cross-pin set 2370 may connect the drive tube 2290 of the insertion mandrel cover 2200 and the outer spiral 2280. The cross-pin set 2370 may thereby connect the drive tube 2290 with the flighting 2300 and with the tube cover shield 2320. As illustrated at FIG. 69, the drive tube 2290 and the outer spiral 2280 define an annular area 2360. The annular area 2360 may be adapted to hold the drive tube 1280 of the insertion tool 1200. The slot set 1370 allows the cross-pin set 2370 to pass through the drive tube 1280. The spiral cut 2286 allows the flighting 1300 to pass through the outer spiral 2280 of the insertion mandrel cover 2200.

Turning now to FIGS. 56-60, an insertion mandrel cover 2200' according to the principles of the present disclosure is illustrated. The insertion mandrel cover 2200' is similar to the insertion mandrel cover 2200 except that flighting 2300' approaches the flighting 1300 of the insertion tool 1200 from above. In contrast, the flighting 2300 of the insertion mandrel cover 2200 approaches the flighting 1300 from below. The insertion mandrel cover 2200' extends between a first end 2203' and a second end 2204', as depicted. As with the insertion mandrel cover 2200, a drive tube 2290 could be included. The insertion mandrel cover 2200' includes an inner surface portion 2206'. The inner surface portion 2206' includes a first portion 2206A' adapted to cover and protect the first tube 120 and a second portion 2206B' adapted to cover and protect the second tube 140. The insertion mandrel cover 2200' includes a lower surface portion 2212' on a tube cover shield 2320'. The tube cover shield 2320' extends along a helical path 2218' a plurality of revolutions 2214' and thereby defines a revolved shape 2216'. As depicted, the revolved shape 2216' is in a form of a cone portion. In other embodiments, the revolved shape 2216' may take a form of a cylinder. The insertion mandrel cover 2200' may include a first tube support track 2220' adapted to cover and protect the first tube 120. Likewise, the insertion mandrel cover 2200' may include a second tube support track 2240' adapted to cover and protect the second tube 140. Similar to the insertion mandrel cover 2200, the insertion mandrel cover 2200' may include a flange 2270', an outer spiral 2280', flighting 2300', an outer edge 2306', and an inner edge 2308'.

Turning now to FIGS. 72-74, an insertion mandrel cover 2400 according to the principles of the present disclosure is illustrated. The insertion mandrel cover 2400 extends from a first end 2403 to a second end 2404. As with other embodiments, the insertion mandrel cover 2400 may include a drive tube 2290. The insertion mandrel cover 2400 may include an inner surface portion 2406 and an upper surface portion 2410. The upper surface portion 2410 may include a first portion 2410A and a second portion 2410B. The insertion mandrel cover 2400 may include a tube cover shield 2520. In particular, the tube cover shield 2520 includes a first tube cover shield 2520A adapted to cover and protect the first tube 120, and a second tube cover shield 2520B adapted to cover and protect the second tube 140. The tube cover shield(s) 2520, 2520A, 2520B may generally follow a helical path 2418 a plurality of revolutions 2414 and thereby define a revolved shape 2416. In the depicted embodiment, the revolved shape 2416 is a cylindrical shape. In other embodiments, the revolved shape 2416 may include a conical shape or a portion of a conical shape.

The insertion mandrel cover 2400 includes a first tube support track 2420 that extends between a first end 2422 and a second end 2424. The first tube support track 2420 includes an interior 2426 and an exterior 2428. The insertion mandrel cover 2400 further includes a second tube support track 2440. The second tube support track 2440 extends between a first end 2442 and a second end 2444. The second tube support track 2440 may include an interior 2446 and an exterior 2448. Similar to previously discussed embodiments of mandrel covers, the insertion mandrel cover 2400 includes an outer spiral 2480 with a spiral cut 2486. The outer spiral 2480 extends between a first end 2482 and a second end 2484. As the insertion mandrel cover 2400 includes a double helix, there is a first spiral cut 2486A and a second spiral cut 2486B. The outer spiral 2480 includes a set of holes 2488. The set of holes 2488 are adapted to receive cross-pins 2572 that extend between a first end 2580 and a second end 2590. A cross-pin set 2570 may include a plurality of the cross-pins 2572. The insertion mandrel cover 2400 includes a pair of flightings 2500 rotationally spaced from each other about 180 degrees. The flighting 2500 extends from a first end 2502 to a second end 2504. The flighting may extend between an outer edge 2506 and an inner edge 2508. The outer edge 2506 may connect with the tube cover shield 2520, and the inner edge 2508 may connect with the outer spiral 2480.

Turning now to FIGS. 75-78, a covered insertion tool 3000 according to the principles of the present disclosure is illustrated. The covered insertion tool 3000 includes the insertion tool 1200 and the insertion mandrel cover 2200. The covered insertion tool 3000 is moveable between a closed configuration 3002 and an open configuration 3004. The covered insertion tool 3000 provides a first protected path 3020 and a second protected path 3040 to hold the tubes 120 and 140, respectively. The first protected path 3020 extends between a first end 3022 and a second end 3024. Likewise, the second protected path 3040 extends between a first end 3042 and a second end 3044. In the open configuration 3004, a space 3006 (e.g., a clearance) opens between the insertion tool 1200 and the insertion mandrel cover 2200 along the first protected path 3020 and along the second protected path 3040. The space 3006 may be opened by rotating the insertion tool 1200 and the insertion mandrel cover 2200 relative to each other (e.g., by an installation tool with two concentric drives). The cross-pins 2372 of the cross-pin set 2370 and the slots 1380, 1390 of the slot pairs 1372 of the slot set 1370 may guide the insertion tool 1200 and the insertion mandrel cover 2200 relative to each other.

In the depicted embodiment, the space 3006 opens between the tube guide support 1320 and the tube cover shield 2320. By opening the space 3006, the tubes 120 and 140 may be released from the covered insertion tool 3000 (e.g., before withdrawing the covered insertion tool 3000 from the soil 2000). Grout may be pumped in along the first protected path 3020 and/or along the second protected path 3040. The grout may leak through the space 3006 and thereby facilitate installation of the tubes 120 and 140 and/or thermally connect the tubes 120 and 140 to the soil 2000. The thermal connection of the grout between the soil 2000 and the tubes 120 and 140 may endure after the covered insertion tool 3000 is withdrawn from the soil 2000. A reduced amount of grout may be required, according to the principles of the present disclosure, compared with an amount of grout required with conventional methods (e.g., drilling boreholes and filling the boreholes with the grout).

Turning now to FIGS. 79-84, a covered insertion tool 3200 according to the principles of the present disclosure is illustrated. The covered insertion tool 3200 includes the insertion tool 1600 and the insertion mandrel cover 2400. The covered insertion tool 3200 is moveable between a closed configuration 3202 and an open configuration 3204. The covered insertion tool 3200 provides a first protected path 3220 and a second protected path 3240 to hold the tubes 120 and 140, respectively. The first protected path 3220 extends between a first end 3222 and a second end 3224. Likewise, the second protected path 3240 extends between a first end 3242 and a second end 3244. In the open configuration 3204, spaces 3206 (i.e., clearances) open between the insertion tool 1600 and the insertion mandrel cover 2400 along the first protected path 3220 and along the second protected path 3240. The spaces 3206 may be opened by rotating the insertion tool 1600 and the insertion mandrel cover 2400 relative to each other (e.g., by an installation tool with two concentric drives). The cross-pins 2572 of the cross-pin set 2570 and the slots 1780 of the slot pairs 1772 of the slot set 1770 may guide the insertion tool 1600 and the insertion mandrel cover 2400 relative to each other.

In the depicted embodiment, the spaces 3206 open between the tube guide supports 1720A, 1720B and the tube cover shields 2520A, 2520B, respectively. By opening the spaces 3006, the tubes 120 and 140 may be released from the covered insertion tool 3200 (e.g., before withdrawing the covered insertion tool 3200 from the soil 2000). Grout may be pumped in along the first protected path 3220 and/or along the second protected path 3240. The grout may leak through the space 3206 and thereby facilitate installation of the tubes 120 and 140 and/or thermally connect the tubes 120 and 140 to the soil 2000. The thermal connection of the grout between the soil 2000 and the tubes 120 and 140 may endure after the covered insertion tool 3000 is withdrawn from the soil 2000. A reduced amount of grout may be required, according to the principles of the present disclosure, compared with an amount of grout required with the conventional methods.

Turning now to FIGS. 85-88, an insertion tool 2600 is illustrated according to the principles of the present disclosure. The insertion tool 2600 extends between a first end 2602 and a second end 2604. The insertion tool 2600 includes a pair of tubes 2610 that are wrapped around a drive tube 2620 in a double helix arrangement 2616. A pair of threads 2630 is also wrapped around the drive tube 2620 in a double helix arrangement 2636. As depicted, the drive tube 2620 may be open from the first end 2602 to the second end 2604. The pair of threads 2630 may be positioned at an interior and/or an exterior of the drive tube 2620.

The drive tube 2620 may be rotationally driven from the first end 2602. A return fitting 2660 may be positioned at the second end 2604. The return fitting 2660 may include a cutting edge 2670 adapted to cut through the soil 2000. The return fitting 2660 may be rotationally connected to the drive tube 2620. The return fitting 2660 may be part of a heat exchanger loop 2700. The heat exchanger loop 2700 is similar to the heat exchanger loop 500, discussed above, but includes the return fitting 2660 instead of the return fitting 560. The return fitting 2660 is ring-shaped and includes a passage 2662 that fluidly connects to the first tube 120 and the second tube 140 of the heat exchanger loop 2700.

By pressurizing the pair of tubes 2610, the heat exchanger loop 2700, including the return fitting 2660 and the tubes 120, 140 may be ejected from the insertion tool 2600. By controlling the ejection and the withdrawal of the insertion tool 2600, the heat exchanger loop 2700 may be left undamaged in the soil 2000, and the insertion tool 2600 may be withdrawn from the soil 2000 and reused.

Turning now to FIG. 89, an example tube support track 2920 is illustrated with a passage 2922 that may be used to inject a fluid (e.g., grout) to lubricate and eject the tube 120, 140 from the tube support track 2920. The fluid may further lubricate the various insertion tools of the present disclosure when sliding against the soil 2000. The passage 2920 may be connected to, for example, one of the ports 1062, 1064, 1066 of the concentric fitting 1060 and thereby receive the fluid.

Turning now to FIGS. 90 and 91, another example tube support track 2960 is illustrated with a pop-off cover 2962 that pops-off the tube support track 2960 when the tube 120, 140 is pressurized.

Turning now to FIG. 92, the actuator 4100 is illustrated with a control system 4200 and sensors including an elevation sensor 4302 (i.e., to measure elevation of the insertion tool 1000), a tube position sensor 4304 (i.e., to measure ejection position of tubes 120 and/or 140 within the insertion tool 1000), an angle sensor 4306 (i.e., to measure angular position of the insertion tool 1000), etc. FIG. 93 illustrates a flow chart for controlling the actuator 4100.

FIG. 92 also illustrates a nut 4400 that may threadingly couple the insertion tool 1000 to the ground 2000 to coordinate withdrawal of the insertion tool 1000 from the ground 2000. FIG. 92 also illustrates a connecting member 4500 (e.g., an excavator) that connects the actuator 4100 to the ground 2000.

FIGS. 94 and 95 illustrate deployable barbs 4700 that may aid in keeping the tube 120, 140 positioned in the soil 2000 when the insertion tool is withdrawn from the soil 2000.

FIGS. 96 and 97 illustrate deployable barbs 4600 that may aid in keeping the return fitting 2660 positioned in the soil 2000 when the insertion tool 2600 is withdrawn from the soil 2000.

The various features of the various embodiments may be combined in various combinations with each other and thereby yield further embodiments according to the principles of the present disclosure.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A method of installing at least a portion of a tube of a tubular heat exchanger in soil, the method comprising:
providing a tool of an installation apparatus;
providing the tube of the tubular heat exchanger;
engaging at least the portion of the tube with the tool and
helically engaging the soil with the tool and thereby installing at least the portion of the tube in the soil and positioning at least the portion of the tube in the soil along a helical path and thereby installing at least the portion of the tube as a helical portion of the tube; and
removing the tool from the soil without uninstalling the helical portion of the tube from the soil.

2. The method of claim 1, further comprising:
providing an actuator of the installation apparatus;
providing a drive member of the installation apparatus;
screwing the tool through the soil by attaching the actuator to the drive member and applying a rotational torque to the tool with the drive member.

3. The method of claim 2, wherein the drive member is a drive tube.

4. The method of claim 1, further comprising:
predrilling a borehole in the soil prior to engaging the soil with the tool.

5. The method of claim 1, wherein the tool includes one or more flights and thereby engages the soil.

6. The method of claim 1, wherein the tool includes one or more threads and thereby engages the soil.

7. The method of claim 1, wherein the tool includes at least one tube guide and thereby engages the tube.

8. The method of claim 7, further comprising:
sliding at least a portion of the tube out of the at least one tube guide and into direct contact with the soil when installing at least the helical portion of the tube in the soil along the helical path.

9. The method of claim 1, further comprising:
providing a second tube of the tubular heat exchanger, wherein the tube of the tubular heat exchanger is a first tube; and
further engaging at least a portion of the second tube with the tool when engaging the soil with the tool and thereby installing at least the portion of the second tube in the soil along a second helical path and thereby installing at least the portion of the second tube as a helical portion of the second tube, wherein the helical path is a first helical path;
wherein removing the tool from the soil does not uninstall the helical portion of the second tube.

10. The method of claim 9, further comprising:
providing a return of the tubular heat exchanger, wherein the return is fluidly connected between the first tube and the second tube at a distal end of the tubular heat exchanger;
wherein the return includes a cutting member configured to penetrate the soil; and
wherein removing the tool from the soil does not remove the cutting member from the soil.

11. The method of claim 1, wherein helically engaging the soil with the tool includes helically engaging the soil below a surface of the soil with the tool.

12. The method of claim 1, wherein helically engaging the soil with the tool includes displacing the soil with the tool.

13. The method of claim 1, wherein engaging at least the portion of the tube with the tool includes protecting at least the portion of the tube from the soil with the tool.

14. The method of claim 1, wherein helically engaging the soil with the tool includes screwing the tool through the soil.

15. A method of installing at least a portion of a first tube and a portion of a second tube of a tubular heat exchanger in soil, the method comprising:
providing a tool of an installation apparatus;
providing the first tube of the tubular heat exchanger;
providing the second tube of the tubular heat exchanger;

engaging at least the portion of the first tube with the tool and engaging the soil with the tool and thereby installing at least the portion of the first tube in the soil and positioning at least the portion of the first tube in the soil along a first helical path and thereby installing at least the portion of the first tube as a helical portion of the first tube;

further engaging at least the portion of the second tube with the tool when engaging the soil with the tool and thereby installing at least the portion of the second tube in the soil along a second helical path and thereby installing at least the portion of the second tube as a helical portion of the second tube; and removing the tool from the soil without uninstalling the helical portion of the first tube from the soil;

wherein removing the tool from the soil does not uninstall the helical portion of the second tube.

16. The method of claim 15, further comprising:
providing a return of the tubular heat exchanger, wherein the return is fluidly connected between the first tube and the second tube at a distal end of the tubular heat exchanger;

wherein the return includes a cutting member configured to penetrate the soil; and wherein removing the tool from the soil does not remove the cutting member from the soil.

17. An installation apparatus for installing at least a portion of a tube of a tubular heat exchanger in soil along a helical path and for leaving at least an installed portion of the tube in the soil when a tool of the installation apparatus is removed from the soil, the installation apparatus comprising:

the tool configured to engage at least the portion of the tube and helically engage the soil and thereby position at least the portion of the tube in the soil along the helical path when installing at least the portion of the tube in the soil as a helical portion of the tube;

wherein the tool is further configured to be removed from the soil without uninstalling at least the helical portion of the tube from the soil.

18. The installation apparatus of claim 17, further comprising:
a drive member configured to apply a rotational torque to the tool; and an actuator configured to attach to the drive member;

wherein the tool is configured to screw through the soil upon application of the rotational torque to the tool.

19. The installation apparatus of claim 18, wherein the drive member is a drive tube.

20. The installation apparatus of claim 17, wherein the tool includes one or more flights and the tool is thereby configured to engage the soil.

21. The installation apparatus of claim 20, wherein the tool includes at least one tube guide and thereby engages the tube and wherein the at least one tube guide is supported by the one or more flights.

22. The installation apparatus of claim 21, further comprising:
a drive member configured to apply a rotational torque to the tool; and an actuator configured to attach to the drive member;

wherein the tool is configured to screw through the soil upon application of the rotational torque to the tool; and wherein the drive member is configured to apply at least some of the rotational torque to the one or more flights.

23. The installation apparatus of claim 22, wherein the drive member is a drive tube.

24. The installation apparatus of claim 17, wherein the tool includes one or more threads and the tool is thereby configured to engage the soil.

25. The installation apparatus of claim 17, wherein the tool includes at least one tube guide and thereby engages the tube.

26. The installation apparatus of claim 25, wherein the at least one tube guide is configured to slidingly engage at least a portion of the tube and is thereby configured to position at least the portion of the tube in the soil along the helical path when installing at least the portion of the tube in the soil.

27. The installation apparatus of claim 26, wherein the at least one tube guide includes a first tube guide and a second tube guide, wherein the at least the portion of the tube includes a first portion of the tube and a second portion of the tube, wherein the first tube guide is configured to slidingly engage the first portion of the tube and is thereby configured to position the first portion of the tube in the soil along the helical path, wherein the helical path is a first helical path, and wherein the second tube guide is configured to slidingly engage the second portion of the tube and is thereby configured to position the second portion of the tube in the soil along a second helical path.

28. The installation apparatus of claim 26, wherein the at least one tube guide includes a first tube guide and a second tube guide, wherein the tube is a first tube, wherein the first tube guide is configured to slidingly engage the portion of the first tube and is thereby configured to position the portion of the first tube in the soil along the helical path, wherein the helical path is a first helical path, and wherein the second tube guide is configured to slidingly engage a portion of a second tube and is thereby configured to position the portion of the second tube in the soil along a second helical path.

29. The installation apparatus of claim 17, further comprising:
a cutting member configured to penetrate the soil;

wherein removing the tool from the soil does not remove the cutting member from the soil.

30. The installation apparatus of claim 17, wherein the tool is further configured to engage the soil at a predrilled borehole.

31. The installation apparatus of claim 17, wherein the installation apparatus is configured for installing at least respective portions of a pair of tubes of the tubular heat exchanger in the soil along a respective pair of helical paths and for leaving at least installed portions of the pair of tubes in the soil when the tool of the installation apparatus is removed from the soil;

wherein the tool is configured to engage at least the respective portions of the pair of tubes and engage the soil and thereby position at least the respective portions of the pair of tubes in the soil along the respective pair of helical paths when installing at least the respective portions of the pair of tubes in the soil as respective helical portions of the pair of tubes; and wherein the tool is further configured to be removed from the soil without uninstalling at least the respective helical portions of the tubes from the soil.

32. The installation apparatus of claim 17, wherein the tool is configured to helically engage the soil below a surface of the soil.

33. The installation apparatus of claim 17, wherein the tool is configured to helically engage the soil by at least displacing the soil.

34. The installation apparatus of claim 17, wherein the tool is configured to protect at least the portion of the tube from the soil at least when installing at least the portion of the tube in the soil.

35. The installation apparatus of claim 17, wherein the tool is configured to screw through the soil when helically engaging the soil.

\* \* \* \* \*